United States Patent
Kaplan

(10) Patent No.: US 6,938,157 B2
(45) Date of Patent: Aug. 30, 2005

(54) DISTRIBUTED INFORMATION SYSTEM AND PROTOCOL FOR AFFIXING ELECTRONIC SIGNATURES AND AUTHENTICATING DOCUMENTS

(76) Inventor: Jonathan C. Kaplan, 443 Peninsula Ave., San Francisco, CA (US) 94134

( * ) Notice: Subject to any disclaimer, the term of this patent is extended or adjusted under 35 U.S.C. 154(b) by 817 days.

(21) Appl. No.: 09/932,547

(22) Filed: Aug. 17, 2001

(65) Prior Publication Data

US 2002/0023220 A1 Feb. 21, 2002

Related U.S. Application Data

(63) Continuation-in-part of application No. 09/642,072, filed on Aug. 18, 2000.

(51) Int. Cl.$^7$ ............................................... H04L 9/00
(52) U.S. Cl. ..................... 713/176; 713/178; 713/179; 713/187
(58) Field of Search ............................... 713/155–156, 713/170, 176, 178–179, 187

(56) References Cited

U.S. PATENT DOCUMENTS

| | | | |
|---|---|---|---|
| 5,136,646 A | * | 8/1992 | Haber et al. ................. 713/178 |
| 5,136,647 A | * | 8/1992 | Haber et al. ................. 713/178 |
| 5,530,757 A | | 6/1996 | Krawczyk |
| 5,781,629 A | * | 7/1998 | Haber et al. ................. 713/177 |
| 6,044,350 A | * | 3/2000 | Weiant et al. ................. 705/1 |
| 6,237,096 B1 | * | 5/2001 | Bisbee et al. ................ 713/178 |
| 6,321,339 B1 | | 11/2001 | French et al. |
| 6,584,565 B1 | * | 6/2003 | Zamek ........................ 713/156 |

* cited by examiner

Primary Examiner—Gilberto Barrón
Assistant Examiner—Minh Dinh
(74) Attorney, Agent, or Firm—Dorsey & Whitney LLP

(57) ABSTRACT

A system can process a digital representation (DF) of a document with a one-way cryptographic hash function (CHF) to yield a digital fingerprint (DFP) value that is associated with the DF. A document identification number (DID) is created, uniquely associated with the DFP, and with DID and DFP are associated optional credential information (C). A registration certificate DFC that represents an optional electronic signature associated with the document and that includes the DID and DFP is promulgated and archived at a plurality of storage locations. The system can authenticate whether a putative document is the original document by generating a digital fingerprint value for the putative document and comparing it to DFP retrieved from various of the storage locations. Authentication can confirm that the electronic signature is unaltered.

31 Claims, 19 Drawing Sheets

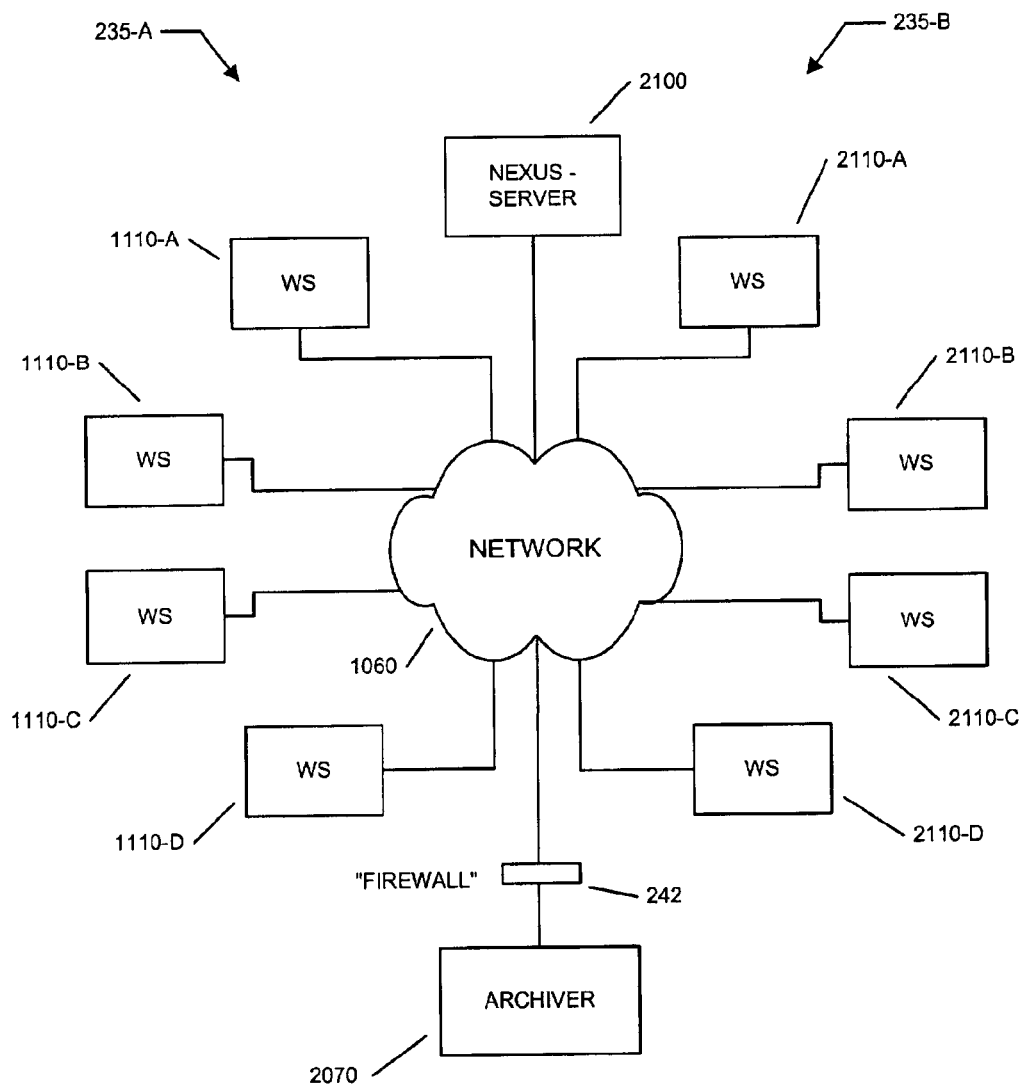
FIG. 15-A

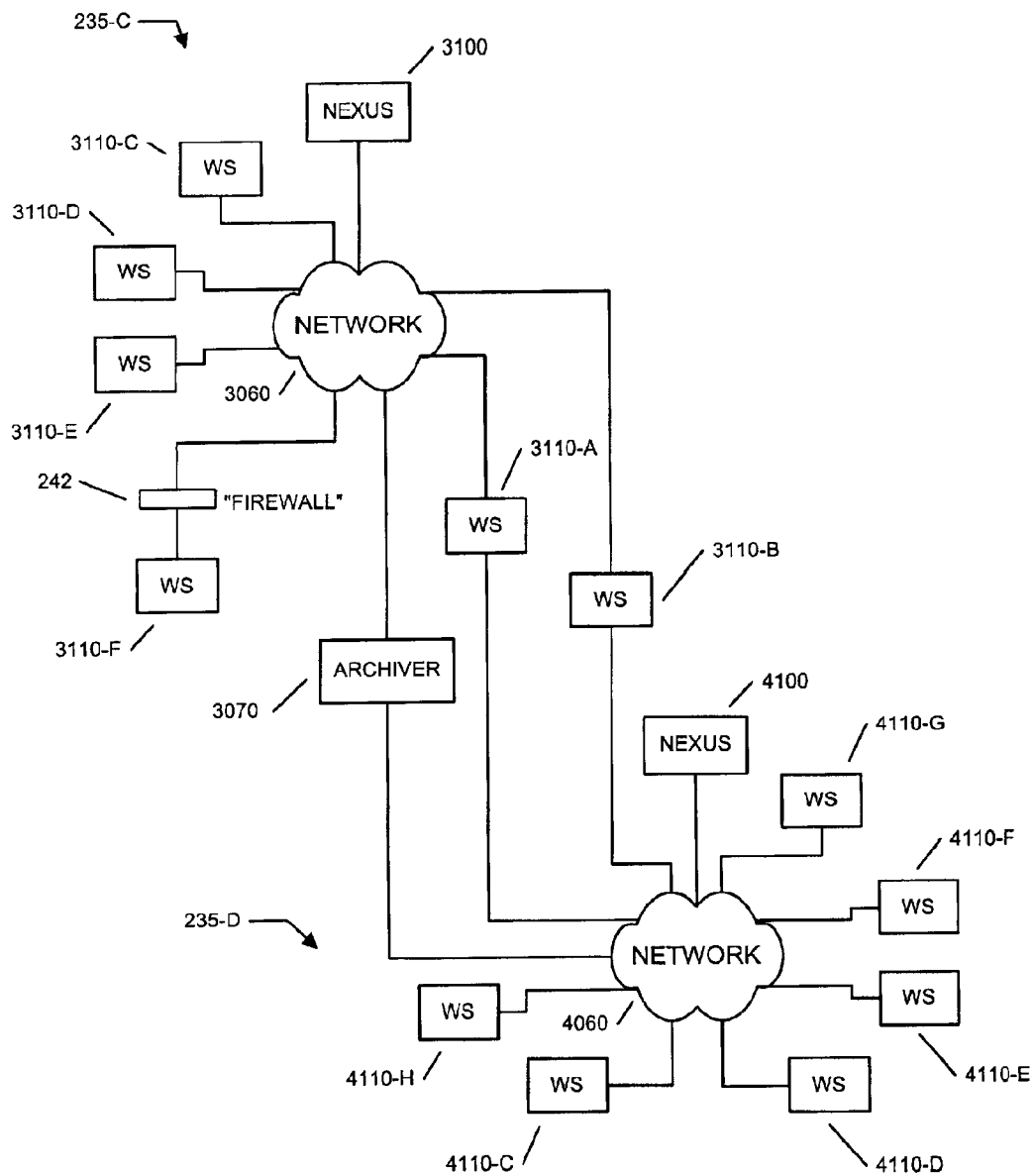
FIG. 15-B

DISTRIBUTED INFORMATION SYSTEM AND PROTOCOL FOR AFFIXING ELECTRONIC SIGNATURES AND AUTHENTICATING DOCUMENTS

CLAIMS OF PRIORITY

This is a continuation-in-part application from applicant's co-pending U.S. utility patent application Ser. No. 09/642,072 filed on 18 Aug. 2000 entitled "Distributed Information System and Protocol for Authenticating Documents", wherein a system and protocol with which the present invention may be practiced is described. Substantial portions of that application are replicated herein for convenience to a reader of the within application.

FIELD OF THE INVENTION

The present invention relates generally to methods and systems to authenticate that an original digital record has not been altered, to methods and systems for affixing electronic signatures to such digital records, for verifying integrity and validity of such records and any electronic signature(s) applied thereto, including determining that such records and any associated digital signatures have not been altered, and more specifically, for providing a distributed method and system for such determination and authentication in which the contents of these records need not be disclosed.

BACKGROUND OF THE INVENTION

Historically, society has relied upon paper bound mechanisms to verify the integrity of documents and to authenticate the identity of originators of these documents and the information contained therein. Sometimes, perhaps when a dispute arose, the validity of such documents would be contested. As a result, society has developed and evolved various accepted procedures and mechanisms to contest the veracity of such documents, as well as procedures and mechanisms by which the accuracy and integrity of such documents can be established and maintained. For example, the State of California has promulgated Probate Code sections to establish such procedures and mechanisms for the designation and declaration of Durable Power of Attorney and 'Attorneys-in-Fact'. In many instances, Public Notaries are required to help establish the identity of the signatory to a document, for example a Deed of Trust. In other instances the law may recognize the usefulness of expert handwriting analysis to determine the veracity of a signature, perhaps the signature of a testator on a contested Last Will and Testament.

With the evolution of modern technology, the use of electronic documents has become increasingly widespread. Such electronic documents can include digital representations of readable text, as well as digital representations of video and audio data, laboratory and research records, as well as auditing and forensic evidence used in establishing the validity and authenticity of these various information types.

Digital records may be created in a variety of ways. For example, a document may be created or modified on a digital computer and saved as a digital file. Computers or other systems may also create binary data and programs, and can modify and append to existing data and programs. A printed document may be scanned and the scanner output saved as a digital file. A digital camera can capture video and/or audio information from a scene, and directly save the captured information as a digital file. In a variety of ways, pre-existing documents, text, images, graphics, murals, videotape, soundtracks, photographic film and the like can also be captured and saved as a digital file. Thus, as used herein, "document" shall be understood to include without limitation information that can be stored or represented in any type of digital format, including the aggregation of multiple documents of differing types, regardless of whether any type of intermediate storage may be used. The terms "digital file" (DF) or "digital encoded record" (DER) shall be understood to include without limitation such digital format representation of one or more such documents.

It is often important to be able to authenticate that a document has not been altered after its creation. For example, merely changing the day of the month upon which a contract appears to have been signed may create advantage for one party to the contract. A digital recording of an interview may be altered, perhaps almost undetectable, to delete an embarrassingly long pause between a question and an answer. A digital photograph may be altered to change the image ostensibly captured by the camera. Equally seriously, digital files may be maliciously altered, for example to create so-called computer viruses that can damage other files on a user's computer system.

Modern technology permits information to be revised all too easily. The lamentable fact that such revisions can often be made without telltale signs of tampering means that there is often insufficient credible evidence attesting to the authenticity and accuracy of such documents or records, including digital documents or records.

How then to authenticate that such documents have not been altered. In the case of printed materials, contracts, photographs, and the like, duplicate copies may be made contemporaneously with the creation of the original document. But such procedure offers little protection against someone, for example the original author, altering and recopying the original document, and substituting newly made copies of the altered document for the original document. So doing could permit repudiating authorship of the original document in favor of the altered document. To some extent this situation may be partially guarded against by promptly distributing the original copies of the true document to at least one trustworthy individual, an escrow holder perhaps. Distributing the document to a collection of trustworthy recipients provides some relief against the possibility that the document may become irretrievable from a single individual. However, the level of confidence provided by such entrustment to escrow holders can diminish as a function of time. The trusted individuals may move away or die, or the documents entrusted to them may become misplaced, lost, damaged, deteriorated with age, stolen, or otherwise irretrievable. It is also possible that one or more such individuals might be bribed or otherwise compromised to allow others to gain access to the information in escrow.

But if the entrusted document contains confidential information, distribution even to trusted individuals introduces the risk that the document may later be disclosed in an unauthorized fashion to a third party. Such risk increases with the number of individuals with whom the document is entrusted. In general, a system seeking to protect authenticity of a document through distribution of its contents risks unauthorized disclosure of confidential information in or associated with the document.

One-way cryptographic hash functions have been proposed as tools useful in assessing the integrity of digitally stored information through the use of message digests. A one-way hash function, which may also be known as a cryptographic fingerprint, cryptographic checksum, or message digest function, preferably has the property that it is collision-resistant or collision-free: that is it difficult to find or to construct two different input values, sometimes called the pre-image, that when passed through the same one-way hash function produce identical output values, sometimes called the hash value. Several one-way hash functions with well-understood collision-resistant properties are in the public domain, many of which functions have well known and unimputable reputations. Exemplary one-way hash functions include the proposed secure hash standards SHA-256, SHA-384, and SHA-512, or the Federal Information Processing Standard (FIPS) Secure Hash Algorithm (SHA-1, FIPS 180-1), both published by the United States National Institute of Standards and Technology (NIST), Message Digest 5 (MD5) developed by Ron Rivest, SNEFRU developed by Ralph Merkle, OpenBSD bcrypt proposed by Niels Provos and David Mazières. Advantageously there is a body of established social, commercial, and legal precedent associated with the use of many prior-art one-way hash functions, often dealing with PKI and digital signature applications.

One exemplary commercial endeavor that uses one-way hash functions includes Tripwire, commercialized by Tripwire, Inc. of Portland, Oreg., which seeks to provide an effective mechanism to monitor integrity of digital files. U.S. Pat. No. 5,530,757 to Krawczyk (1996) discloses systems that purport to distribute the results of one-way cryptographic hash functions to a plurality of storage locations. However Krawczyk appears to promulgate different hashed values to different storage locations without regard to the attendant inefficiencies resulting from such a convoluted distribution scheme. Further, Krawcyzk's approach presupposes that a majority of all such storage locations will always be available for verification to occur. In practice, the operational requirements of a Krawczyk-type system would create undesirable complexity during the system encoding and verification phases.

Various solutions have been proposed in the prior art to verify the integrity of electronic documents and specifically to affix electronic signatures to such documents. But such prior-art solutions based upon cryptographic hash functions still lack sufficient capability and control to implement practical use of electronic signatures, especially under applicable regulations and statutes. Indeed the impracticality of such approaches is demonstrated by their lack of widespread commercial adoption.

Other prior art approaches rely upon encryption and cryptography to provide so-called digital signatures in an attempt to authenticate identity of a document originator and provide some assurance as to integrity of the electronic document itself. However such approaches are justly criticized for their complexity, the frequent unpredictability of their behavior, uncertainty as to the effectiveness of any security that is imparted, as well as the fragility of the overall systems.

Several techniques are commonly known to encrypt digital files, including files that may represent documents. Such techniques seek to minimize the risks associated with disclosure by encrypting documents that contain confidential information. In so-called symmetric (or secret key) encryption, a digital file is encrypted with a key, and then transmitted to a recipient who then decrypts or deciphers the digital file using the same key. But it is not practical to share the same secret key securely with a number of potential recipients, especially on a global scale. If anyone in possession of the secret key permits it to be comprised (intentionally or otherwise), any information encrypted with that key may also be compromised. Further, the secret keys must somehow be communicated to all intended recipients, but not to others, in a secure fashion. Managing distribution of these secret keys to a large number of recipients, and ensuring that the keys remain secret over any length of time, can be a difficult and intractable problem.

So-called asymmetric (or public key) encryption uses pairs of mathematically linked keys such that a document encrypted with one of the keys (a "public key") can only be decrypted using the counterpart key (a "private key"). In this prior art encryption technique, the recipient's public key is obtained and is used to encrypt a digital file. The thus encrypted digital file is then transmitted to the recipient, and can only be decrypted with knowledge of the corresponding private key. Such public key cryptography overcomes the need to share secret keys with other parties. However, these prior art techniques rely upon some method of distributing the relevant public keys to other parties and require all parties to maintain absolute confidentiality of their private keys.

Thus, symmetric and asymmetric cryptography each rely upon maintaining the absolute confidentiality of the secret or private key. Unfortunately there are numerous ways by which these keys can become compromised, a problem that is exacerbated when the keys are frequently reused. Public key cryptography further requires an extremely reliable mechanism to ensure than an individual's private key has not been surreptitiously compromised. If an individual private key became known to an unauthorized person, or a copy of an individual private key were obtained by an otherwise authorized third-party, it would be nearly impossible to distinguish between authorized and unauthorized users of the cryptographic keys. Thus, the protection provided by modern cryptography is only as good as the ability to ensure that relevant keys are accessible only to authorized individuals, to the exclusion of all others.

Mitigating risks associated with use of such keys often requires implementing access control procedures that allow properly authenticated individuals access to these keys, while denying access to unauthorized parties. Such prior art access controls include use of passwords, biometrics, and access tokens, although the high cost and complexity of biometrics and tokens limit their widespread use. As a result, passwords remain the most prevalent access control mechanism deployed today.

Private keys are typically stored and thus may be vulnerable to compromise from other parties. The level of protection afforded to key storage is typically no better than one's ability to select and guard passwords that cannot easily be compromised, e.g., by guessing or theft. Unfortunately, many easily implemented techniques known in the art enable an unauthorized party to circumvent protection afforded by passwords, and thus improperly gain direct assess to the underlying private keys. As computer processing power continues to increase exponentially, it is becoming increasingly possible to utilize well understood cryptographic attacks to circumvent such protections. Consequently, absent costly and complicated devices (e.g., biometrics, tokens, etc.), the overall security afforded to these private keys can be no greater than the security afforded by the passwords protecting these keys.

Thus, absent adequate legal and technical assurance that a private key remains in the control and custody of the sender or originator of a message, it is possible for the sender to later deny having processed the information. Stated differently, absent such safeguards, the possibility exists that a person can later disavow the use of his or her electronic signature, for example as affixed to a contract or other document.

Prior art techniques that rely upon use of public key cryptography also require absolute knowledge that a given public key was issued by a particular individual and by no other. Understandably, authentication and confidentiality of any document could be completely undermined and compromised if unauthorized public keys could be created and distributed. If one could generate a counterfeit key pair and then substitute the counterfeit public key for a genuine public key, it would be possible using the counterfeit private key to decrypt information encrypted using the now-substituted counterfeit public key. Sharing an individual's public keys with a large number of potential recipients, especially on a global scale, is a difficult undertaking. It is known in the art to use a central authority to facilitate the widespread distribution of public keys in a secure fashion. However, a recipient must have a nearly blind level of trust in one or more of these distribution hierarchies, each of which culminates in a central facility that somehow ensures that a given public key is properly associated with a given individual. But should the integrity of the central facility be compromised in any way, the entire premise enabling document authentication can suddenly become untenable.

As used herein, the term "public key infrastructure" (PKI) is understood to include the collection of hardware, software, polices, and individuals that, when fully and properly implemented, can provide a suite of information security assurances, including varying levels of confidentiality, data integrity, and authentication. However, formidable challenges remain that impede widespread use of PKI, including access controls on private keys, poor interoperability, limited operational experience, high implementation costs, lack of well-defined and enforced security polices, and insufficiently trained personnel. As a result, although PKI technology has been available for many years, most adopters of this technology remain at an early stage of implementation, and it is still not well understood how well this technology will truly scale and interoperate within the business and government sectors. For example, the United States General Accounting Office has stated (GAO-01-277, 2/2001) that PKI still faces formidable challenges and that to date most PKI deployments seem to be limited to pilot programs, targeted special-purpose applications, or the like. In the face of such just criticism, as well as problems associated with interoperability, many issues must be overcome before PKI-type technology will be widely and effectively adopted.

By way of example, companies such as Verisign, Inc. of Mountain View, Calif. will provide an assertion that a given public key indeed belongs to a given entity, and will distribute such assertion in the form of a so-called digital certificate that can be used to encrypt documents and affix digital signatures to such documents. Thus if a user has sufficient trust in these assertions, there would be a reasonable belief that the public key belongs to the individual so endorsed by Verisign, Inc. But such prior art techniques require that a user have almost blind trust in the integrity of such companies, as well as have absolute confidence in the companies' ability to maintain these assertions over time. Without absolutely reliable means to ensure an individual's private key has not been compromised, intentionally or otherwise, an individual could reasonably claim that their key had been used in an unauthorized fashion, thus undermining the effectiveness of PKI-based systems.

But even if relevant cryptographic keys could remain forever sacrosanct, the author of an original undistributed document could still subsequently alter and then re-encrypt or re-sign the document, permitting successful modification of the original document. As such, prior art methods using public and secret key cryptography are insufficient to authenticate that a document has not been altered, even by its author, after its creation. Simply stated, it has been quite difficult in the prior art to reliably prevent repudiation with any real degree of assurance.

Further, the algorithms used in public and private key cryptography tend to be very computationally intensive, often requiring powerful hardware that might not otherwise be needed. The result is to increase the commercial cost of such protection as may be provided by such techniques. Yet another disadvantage of encryption techniques is that they often are subject to export and import restrictions imposed by various governments, including the U.S. government. The degree of difficulty in obtaining the appropriate import and export licenses for products that employ the use of encryption hardware and/or software can greatly hamper the commercial viability of such products.

In summary, significant and widespread barriers continue to preclude the general adoption of the above-described prior-art solutions, whether based on public key cryptography or upon traditional cryptographic techniques. It is fair to say that information systems that depend upon maintaining secret information, such as cryptographic keys, are only as trustworthy as the least trusted component within the overall system, analogous to the weakest link in a chain. This statement holds true whether the system is composed of individuals, of organizations, or an amalgamation of electronic or other computer storage and retrieval devices. Consequently, cryptographic techniques that are built solely upon the foundation of closely guarded secrets must not be relied upon to preserve confidentiality or authenticity of documents. Due to limitations inherent in prior-art methodologies, society still relies heavily upon paper bound protocols and processes, even though high speed computers and communications media such as the Internet have come into widespread use.

Thus, there is a need for a simple and reliable system and protocol to assess the integrity of large quantities of digitally stored information, and to determine at some later date whether any monitored information records have been altered. Such protective functionality should preferably include a mechanism to apply electronic signatures to electronic records, to permit verification of integrity and validity of these records to which such signatures have been applied, and to determine whether such records and associated signatures have been altered. Preferably such verification and authentication protective functionality should be associated directly with the document or with a document characteristic not readily altered or counterfeited. These capabilities should not require the use of public or private key cryptography, and should operate without having to entrust confidential information to any central entity or organization. Furthermore, such system and protocol should function without a need to maintain secrets that could be lost, stolen, or otherwise compromised. Further still, the nature of the protection provided by such system and protocol should be such that a disclosure, authorized or otherwise, of information maintained within the system will not jeopardize confidential or functional properties of the system. Such system should operate to prevent repudiation in the event of the theft or re-signing of a document, and the protection afforded should not diminish with time.

Further, there is a need to implement such protection using a distributed information system and protocol whereby characteristic(s) of the original document are distributed to a sufficient number of partially trusted recipients, none of whom requires any knowledge as to the nature or contents of the original document, or its author, thus protecting confidentiality. Preferably, the protection afforded by such system and protocol should be built upon accumulated incremental trust imparted by a collection (or cluster) of such partially trusted entities, such that any loss of confidence in one or even several entities entity will not appreciably diminish overall system protection. Further, the loss or unavailability of one or more distributed entities should not reduce trustworthiness of the overall system by more than the incremental level of trust provided by the unavailable entities. Further, each of these partially trusted entities should be able to independently verify and attest to the time that the document, or an attribute of the document, was registered by such a system and protocol, thus eliminating the need for a single trusted time-stamping authority.

In short, there is a need for a system and protocol by which authenticity and integrity of a document representable as a digital file may be ascertained at some later date, without knowledge of the original document. There is a need for a system and protocol meeting the above goals that also complies with relevant regulatory and statutory requirements, so as to be legally enforceable, and can also be implemented with existing hardware and software tools. The resultant system and protocol should also permit electronic signatures to be substituted for original handwritten signatures on documents, agreements, and contracts that previously required paper bound processes and methods to retain the validity, enforceability and full legal effect otherwise accorded to original handwritten signatures. Further, such system and protocol should permit capturing and promulgating the intent underlying prospective use of the electronic signature. In addition, an anonymous user of the system and protocol should be enabled to later establish his or her identity as an author or signer of a document promulgated by the system. Preferably such system should usable with a range of computing systems including cellular telephones, PDAs, automated teller machines, among other information type appliances.

The present invention provides such a distributed information system and protocol.

SUMMARY OF THE INVENTION

To promote a better understanding of the present invention, applicant's parent or first invention will be summarized. The first invention provided a distributed information system and protocol allowing substantially real-time registration of digitally encoded information representing a document. Registration permitted subsequent verification of authenticity and integrity of a document previously processed using the described system and protocol. A supervising nexus-server generated a coupon that was returned to the user-registrant, e.g., the person or entity causing the document to be registered. The coupon was tantamount to an entry ticket that entitled the user-registrant to input a document to a client system. The client system formed a digital file (DF) representation of the document, and processed the DF using a cryptographic hash function (CHF) or similar one-way mapping function to yield a unique digital fingerprint (DFP) of the document. This DFP and associated information ($DFP_M$) was promulgated throughout the system to witness-servers (WS) for storage. As used herein, the notion WS shall denote one or more witness-servers, preferably associated in a relevant cluster of WS. A not necessarily real-time synchronization protocol permitted WS in a relevant cluster that might not have successfully received the information promulgated in real-time to now receive such information from those WS that successfully received such information. The DFP could later be retrieved as needed from at least some WS in the relevant cluster to verify that the original document had not been altered subsequent to promulgation of the DFP. Since it would be difficult if not impossible for any person to contact every recipient WS to coerce or otherwise persuade each WS to substitute a digital finger print value for the promulgated DFP, it would subsequently be possible to demonstrate using DFP information whether the original document was altered subsequent to DFP promulgation.

The nexus-server provided a management system separate and independent from the witness-servers, and played no direct role in the witnessing process that occurred during document registration. Further, the nexus-server provided operational system oversight and ensured that all procedures and rules were adhered to by each witness-server within a cluster. The nexus-server ensured that each witness-server properly interacted with other witness-servers within a cluster, and that each witness-server adhered to procedural operations and archiving activities necessary to maintain overall system integrity and competence. The nexus-server created and enforced procedures that were consistently and uniformly applied throughout the system to establish and maintain evidentiary records necessary to audit and verify that the system is operating correctly. When needed, these records could be used as evidence to corroborate the authenticity and integrity of digital information registered within the system, and authenticity of the underlying document. A clear separation between witness or storing functions by witness-server, and the nexus-server responsibility of ensuring that the operational capabilities of the overall system was satisfied on an ongoing basis.

Thus, in applicant's first invention, the user-registrant presented a coupon and caused the DFP for the document in question to be presented to a primary witness server (PWS) for promulgation. Within that system, a number of WS received the DFP for archival storage and acknowledged (ACK) receipt back to the PWS along with receipt timestamp type information. As noted, inter-WS synchronization could result in additional WS eventually receiving the DFP information. Although the $DFP_M$ generated from the document was promulgated, the promulgated $DFP_M$ per se provided no information about the document, or information contained in the document, document authorship, or even date of document creation. Recipient WS received a specific characteristic of the document, but received no knowledge as to the nature or contents of the document. A registration certificate created during $DFP_M$ promulgation was available to establish time and date of registration of the original document, but the registration certificate advantageously did not include or reveal information contained in the original document.

Confirmation of whether the document was subsequently altered involved generating a DFP' from a putative document, and comparing this DFP' with DFPs stored and returned from at least a minimum quorum number Q of WS. But in that first system, communicating a coupon to the user-registrant disadvantageously tasked the nexus-server and the overall system with managing coupons, replacing lost coupons, ensuring that coupons were not re-used, etc. Further, while the first system could provide confirmation as to whether a document had been subsequently altered, essentially no information was maintained to evidence intent of the user-registrant in submitting the document into the system. Further, the authentication mechanism used in the first invention did not provide for affixing an electronic signature to the document submitted into the system.

In the present invention, coupons (DID) are still generated by the supervising nexus-server, but the nexus-server distributes the coupons directly to primary witness servers (PWS) upon request, thus sparing the user-registrant from having to manage coupons. As such, system overhead associated with coupons is localized to the PWS, and advantageously reduced in the present invention. Further, in the present invention, document DFP as well as optional user credentials (C) are communicated by the user-registrant to the PWS, which combines this information with the coupon for promulgation to witness-servers throughout the system. In the first invention, authentication servers were used essentially to police who had a right to use the system.

But in the present invention, authentication servers also can help establish identity of the user-registrant. Such identification information is useful to demonstrate how and where the document in question came to be input to the system, as well as to reveal an explicit intent (or signature-declaration SD) of the user-registrant in submitting the document. Further, the present invention enables an electronic signature to be affixed to a document being registered, such that the electronic signature may be legally equivalent to a written signature. Further, authentication servers advantageously can help establish date and time of creation of an electronic signature and document promulgation using the present invention.

Towards that end, what is promulgated in the present invention includes document information (IV, $DFP_M$) as well as user-registrant credential information (C) that may be used to authenticate identity of the user-registrant. Thus, as used herein, an electronic signature can be created combining DF attributes with a declaration statement as to the declared intent of the apparent author of the document to be promulgated. Further, electronic signatures may themselves be regarded as a type of document (albeit a sometimes short document) that can be promulgated according to the present invention, and/or can be appended to an original document to create yet a third document, to be promulgated according to the present invention. Advantageously, the information promulgated in the present invention does not include information concerning the underlying document, its authorship or date of document creation. Thus, information promulgated in the present invention is not subject to a loss of confidentiality as what is promulgated is by itself essentially unintelligible as a source for such information.

In applicant's first invention, information was stored archivally in WS. By contrast, in the present invention, in addition to such information as the WS store, dedicated archival storage is maintained for information that corroborates the bona fides of the electronic signature that may be affixed to the document. Further, the present invention advantageously creates and uses declaration of fidelity certificates (DFC, $DFC_T$), also termed (digital) registration certificates. At least one of these certificates is created with each promulgation event. The present invention can be used with existing archival mechanisms to enhance reliability, trustworthiness, and effectiveness of such storage mechanisms. The registration phase of the protocol described by the parent application provided a procedure to register documents ostensibly in real-time, while the synchronization phase of the protocol advantageously did not need to take place in real-time. The system and protocol described in the present invention further includes methods to capture testimony (T) relevant to establishing and maintaining the bona fides of electronic signatures, as well as exemplary methods to integrate document storage and archiving subsystems into the system. In the present invention, a system of record (SOR) system is provided to record and evidence accepted for archiving showing that authentication credentials (C, $AR_C$) provided by the user-registrant were accepted as valid, as well as information associated with affixation of electronic signatures.

Thus, the present invention advantageously can verify several types of information. The present invention, like the parent invention, can verify that a document once promulgated through the system as a digital fingerprint has not been altered, and can use time-stamp information to corroborate when promulgation occurred. If desired, a promulgated digital fingerprint may represent many combined digital files. The present invention can use electronic signature information associated with a document as a special type of document (e.g., a digitally encoded record containing the electronic signature information) that once promulgated through the system, precluded alteration of the electronic signature. The present invention can treat the signature-declaration information as the user-registrant's explicit expressed intent explaining why the electronic signature was attached to the document. Since the signature-declaration can be regarded as a document, the present invention prevents signature-declaration information from being altered (surreptitiously or otherwise) after promulgation through the system. Further, in the present invention a user-registrant may also choose to submit for promulgation with the document digital file a 'one-time use' piece of information allowing the user-registrant to subsequently identify themselves without having to lose anonymity at the time of document registration. This aspect may be referred to as addressing a "whistle blower's" dilemma.

Verification that a promulgated document has not been altered may occur as has been described with respect to the parent invention, e.g., if at least a minimum number of witness-servers report back with a same DFP as matches a DFP' generated from a putative document, then it is known that the putative document is the unaltered original document. As noted, electronic signatures and signature declarations may themselves be regarded as documents or digitally encoded records. Thus, the present invention permits subsequent verification of authenticity and integrity of such documents, including documents containing electronic signatures and signature declarations, once promulgated using the present system and protocol. These various advantages are provided by a distributed system that does not rely upon secret and/or public key cryptography, does not require disclosing confidential information, does not implement a rigid trust model in which secrets must be maintained, and does not require a single highly trusted centralized entity for operation. Instead, a distributed information system and protocol is implemented in which the unintended disclosure of information does not impair ability of the system to function as intended, and in which trustworthiness provided by the system is unlikely to substantially diminish over time.

Other features and advantages of the invention will appear from the following description in which the preferred embodiments have been set forth in detail in conjunction with the accompanying drawings.

BRIEF DESCRIPTION OF THE DRAWINGS

FIGS. 15A and 15B depict exemplary systems by which multiple clusters of witness servers can be created using shared hardware, according to the present invention;

DETAILED DESCRIPTION OF THE PREFERRED EMBODIMENTS

Figure 1:
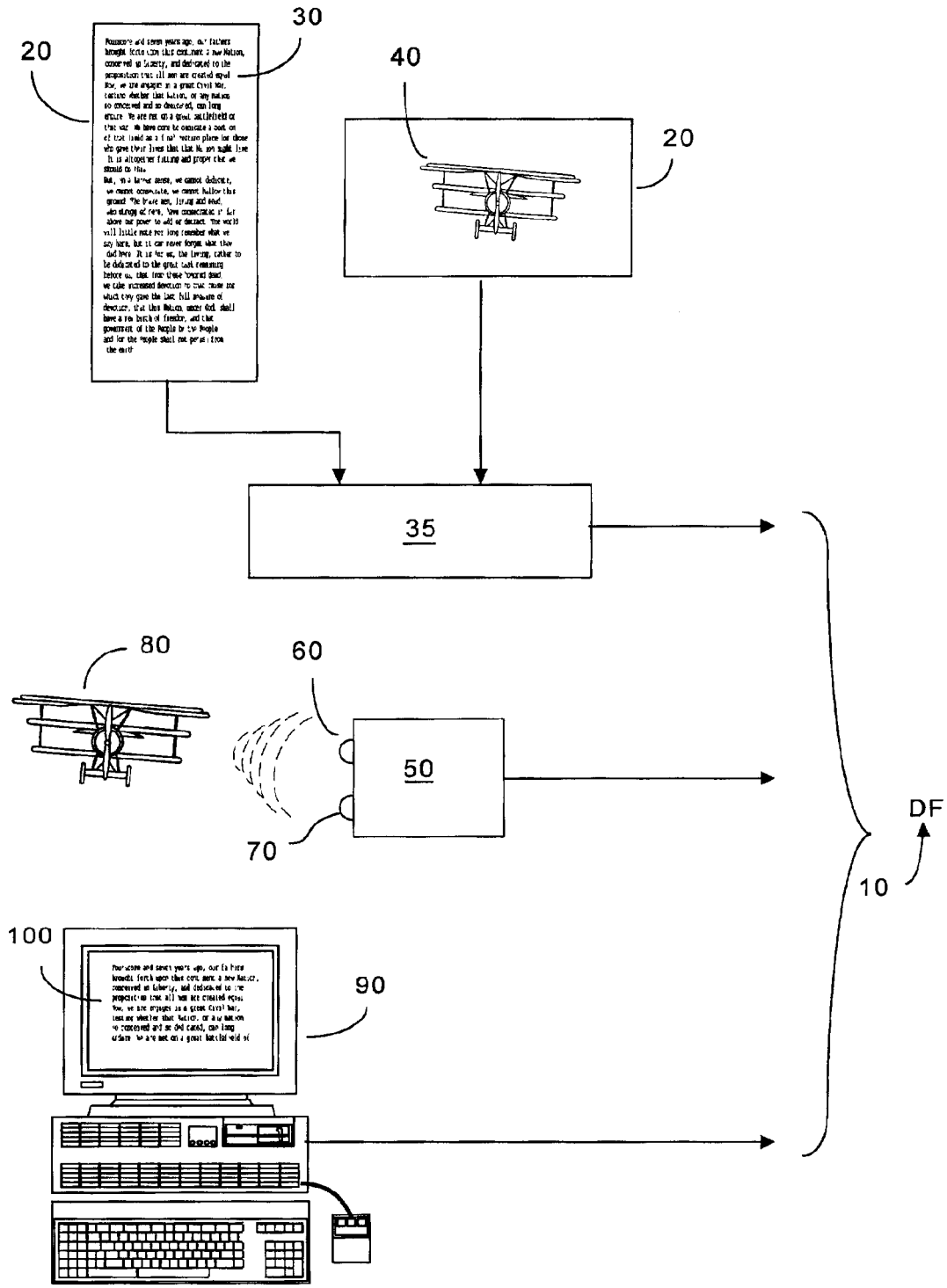
FIG. 1 depicts generating a digital file, according to the prior art.

For ease of understanding the present invention, the invention of applicant's parent application (or the "first invention") will now be described with respect to FIGS. 1–5, which figures appeared in the parent application. Applicant's first invention provided a distributed information system and protocol to permit a user or registrant (e.g., a user-registrant) to register a digitally representable document with the system such that one could later verify that the original document had not been altered. It is understood that the user-registrant need not be the author of the document to be registered. For example, the user-registrant may register the document for the true author, or even if the user-registrant created the document, the creation may have been to copy an original document authored by another.

As noted, "document" broadly and without limitation refers to information storable or representable as information that can be digitally encoded, or digitally stored, or otherwise digitally represented in some type of digital format, a digital file (DF). A "document" can include as a single document or record an aggregation of different document types, for example an electronic signature, and can include an aggregation of multiple documents or records, including documents or records having multiple formats, regardless of whether any type of intermediate storage may be used. Within the context of the present invention, documents and records may be said to exhibit the same underlying properties: namely they exist or can exist in electronic form, and may therefore benefit from the advantages offered by the present invention as described herein. Within the context of the present invention, an "electronic signature" may, without limitation, essentially be used in any fashion for which a human-written "conventional" signature might be used.

"Digital file" (or "digital record" or "electronic record") broadly and without limitation refers to such digital format representation of one or more documents. "Verify authenticity" means the ability to demonstrate that the original document was not altered in any way after promulgation of a digital fingerprint number (DFP) created from the DF that represents (or is) the original document. The DFP represents a characteristic of the document being registered, which characteristic cannot be counterfeited or otherwise recreated without knowledge of or access to the original document, or a copy thereof.

Applicant's first invention and the present invention provide a system that includes a plurality of separate so-called witness-servers (WS) groupable as a cluster, and an overseeing so-called nexus-server. The witness-servers and the nexus-server are each preferably networkable computer systems that can intercommunicate over a medium, for example the Internet. A user-registrant causes the DFP for a document representable as a digital file (DF) to be registered to be presented to a primary witness-server (PWS). The DF was input to at least one one-way collision-resistant hash function such as a one-way cryptographic hash function (CHF) or other one-way mapping function. The DFP output by the CHF is a unique characterization of the DF, yet provides no meaningful information as to the DF that was transformed or the underlying document. The user-registrant could perform the CHF transformation to obtain the DFP, or the system could generate the DFP. The PWS promulgates the DFP in substantially real-time to at least a sub-set cluster of the witness-servers (WS) in the system for storage. A not necessarily real-time synchronization of information then occurs among substantially all WS in the system, by which WS that for whatever reason did not receive the DFP, can now receive the information from recipient WS. In a manner analogous to the first invention, the nexus-server supervises the overall system, but need not itself store the DFP. Although the document DFP is promulgated, the nature of the DFP is that it provides neither information to the witness-servers, nor indeed to anyone, as to the nature or content of the registered document, including its authorship. Stated differently, no disclosure of any confidential information was required for system operation.

Once the DFP has been promulgated to the witness-servers, it is no longer possible in practice to alter the original document and expect the alteration not to be demonstrable. If and when authenticity of the original document is to be verified, relevant recipient WS are requested to provide the DFP value they received and are storing. Understandably, once the DFP value has been promulgated and stored by the various WS, it is not feasible for anyone or any entity (including the entity or user-registrant controlling the underlying document) to alter every copy of the DFP values stored by the WS. Such alteration, to go undetected, would require collusion with every single WS, of which there may be a great many. Stated differently, compromising the integrity of a document promulgated by the invention without detection would require a conspiracy, e.g., at least two persons or entities. Further, as the number of promulgated copies is increased, the difficulty of successfully compromising document integrity increases substantially.

During document authentication, the stored DFP value from the WS is compared to a DFP' value generated from a putative document (the document alleged to be the unaltered original document). DFP' will be generated from the putative document using the same CHF as was used to create the DFP for the original document. There is no requirement that identification of the relevant CHF be concealed, and indeed the relevant CHF may be publically identified.

If there is agreement between the original DFP value provided by the WS and the newly generated DFP' value, the putative document is proven to be the unaltered original document, or a true copy thereof. Ideally every WS will return an identical DFP value, but it is possible that the DFP value stored with some of the WS has become corrupt, lost, or even intentionally altered. But if a substantial number of WS provide the same DFP value, which value is identical to the newly generated DFP' value, the putative document is very probably the unaltered original document. If none of the WS provides a DFP value that agrees with the newly generated DFP' value, the putative document is not the original document. In this fashion, the first invention (and indeed also the second invention) could authenticate an original document without jeopardizing contents or confidentiality of the document or its authorship.

FIGS. 1–5 were included in the parent application. FIG. 1 depicts several exemplary types of digital files (DF) and shows how DFs may have been generated using devices and techniques well known in the art. For example a document 20 may contain text 30, or graphics 40, or indeed a combination of each. Such document may be passed through a scanner 35, whose output will be a digital file, denoted DF or 10. Instead of being converted and created by a scanner device, digital files 10 may be generated directly by appropriate devices. For example a device 50 can receive audible signals 60 and/or visual signals 70 from an object 80. Device 50 can directly output a DF representing either or both of these inputs. Without limitation, device 50 may include a still digital camera, a digital video camera, a digital voice recorder. Alternatively, quite commonly a digital file 10 may instead be generated by a user operating a computer system 90. Text and/or images 100 are generated in a digital format and can be exported directly from computer system 90 as a digital file. It is understood that audio and/or video signals may also be generated from a computer system 90. Computer or other system 90 may also create binary data and programs, including without limitation native executable codes (e.g., binary "*.exe" files), portable executable instructions (e.g., programs complied into Java byte code), interpreted scripts (e.g., CGI files, Perl programs, shell scripts, JavaScript). Thus, the meanings of "document" and of "digital file" as used herein are intentionally broad.

Those skilled in the relevant art will recognize that a one-way hash function, which may also be known as a cryptographic fingerprint, cryptographic checksum, or message digest, preferably has the property that it is collision-resistant or collision-free. This property means it is difficult to find or construct two different input values, sometimes called the pre-image, that when passed through the same one-way hash function produce identical output values, sometimes called the hash value.

As used herein, a cryptographic hash function (CHF) will include one or more one-way hash functions that provide collision-resistance and are provided with a DF as input. When presented with at least a DF input of an arbitrary length, typically presented as a fixed-length array of eight-bit (byte) values, the CHF will produce an output numerical value, a digital fingerprint number (DFP). The DFP number may be presented as a fixed-length array of eight-bit bytes, or as a bit vector of fixed or varying length. Further, as used herein, CHF shall also be understood to include the use of one or more distinct one-way collision-resistant hash functions through which the DF can be passed in any combination and ordered in any sequence, and/or combined with other inputs, so as to produce a digitally encoded fingerprint DFP that has the property of being a unique characteristic of the original DF. As was noted in the Background of the Invention, many one-way hash functions are known, and many of these may be used with the first invention or with the present invention to generate a DFP, e.g., SHA, SHA-1, SHA-256, MD5, etc.

For all intent and purpose, it is very difficult and probably impossible to construct a counterfeit DF that when passed through the same CHF would yield the exact same DFP produced from the authentic DF and the same CHF. Stated differently, if the original document or original DF were in any way altered, whether by the author or by some unauthorized third party, CHF transformation of the altered (putative) document DF would always yield a new DFP (noted herein as DFP') that would differ substantially from the original DFP. Even if the original document were altered in a trivial fashion, perhaps by simply adding one space between words in text, DFP' would be very different from the original DFP. Thus, a comparison of DFP and DFP' values can establish that the putative document resulting in the new but different DFP' was not the original (unaltered) document.

The combination and ordering of the one-way hash functions used to construct the CHF may include concatenating, appending, prefixing, and postfixing the output of any of said one-way hash functions with the DF, thus producing a new DF that is derived from the original DF, but containing all of the information present in the original DF, and again passing this new DF through one or more one-way hash functions to produce a final DFP value. Furthermore, since a CHF is by definition at least a one-way hash function, it is possible to construct a new CHF based upon one or more CHF definitions, in any combination or ordering as previously described. An exemplary bit-length for the DFP value output by the CHF might be fixed at 160 bits, although other bit-length output values may instead be used, including the use of variable bit-length values, depending upon the specific one-way hash function(s) and/or CHF(s) used. Note that however it is generated, the DFP value will be unique to the DF, but will provide essentially zero information as to the nature or content of the DF or the underlying document (if any) represented by the DF.

Figure 2A:
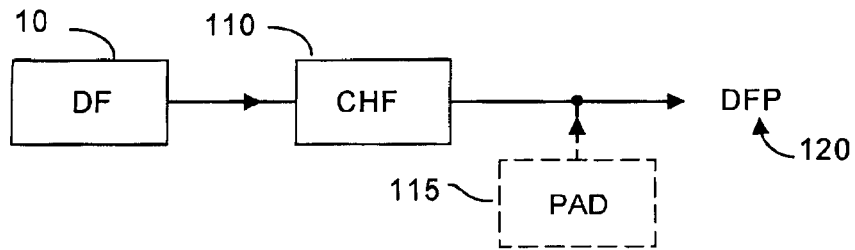
FIGS. 2A–2C depict exemplary methods of creating a digital fingerprint from a digital file using at least one one-way cryptographic hash function as used in applicant's first invention and as may be used with the present invention.
Figure 2B:
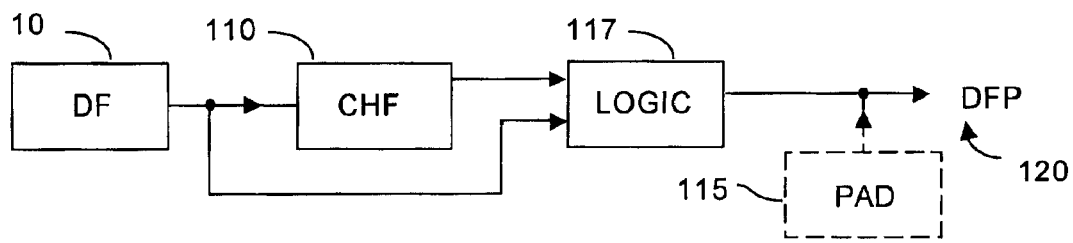
Figure 2C:
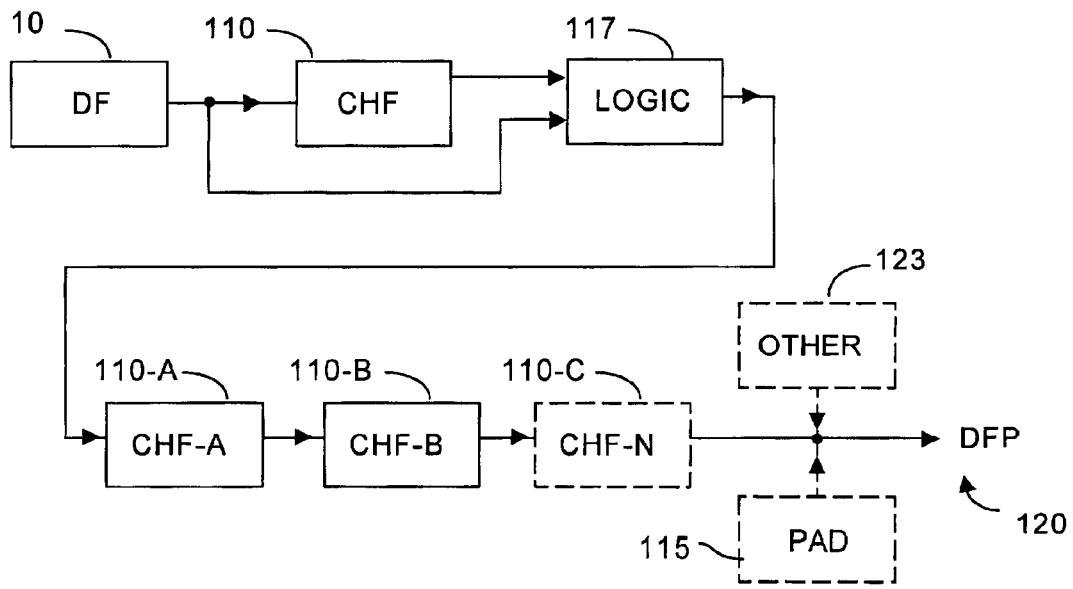

Referring now to FIGS. 2A–2C, regardless of how it was created, DF 10 will be passed through at least one one-way collision-resistant hash function, preferably a CHF, e.g., CHF 110 and/or CHF-A 110-A, CHF-B 110-B, . . . , CHF-N 110-C, to create DFP 120, a number that is a unique characteristic of the underlying DF. As indicated by phantom box 115 in the figures, optionally one may intentionally pad the number of bits in the output DFP value. One advantage of pad bits, including the use of quasi-random pad bits, is to help guard against registrants attempting to register documents with applicant's first invention (or indeed with the present invention), for example by using forged coupons.

Depending upon the level of protection desired and amount of available storage, one or more cryptographic hash functions (CHF) can be used to construct the DFP. As shown by FIG. 2B, if desired, one could initially pass DF 10 through CHF 110, perhaps a SHA-1 function, and then use logic such as combinatorial logic 117 to concatenate the a SHA-1 output from CHF 110 to the end of the original DF. This use of an effective composite CHF will produce an extended digital file that can be used as DF 10. This new DF would be based on the original DF, but advantageously could provide mathematical and cryptological properties not necessarily present in the original DF. As indicated in FIG. 2B, padding could also be used to extend the total bit-length of DFP 120, or as shown by FIG. 2C, element 123 ("OTHER"), to append or embed other relevant types of information. Although neither needed nor required by applicant's first invention or in the present invention, appending, embedding, tagging, and/or padding of additional information to the DFP can advantageously permit the creation and use of alternative types of catalogs and indices for storing and retrieving records. Without limitation tagging could identify any redundant archiving medium, for example a widely distributed newspaper 407 (see FIG. 4). For example, by publishing information contained in the registration certificate to a widely distributed archived newspaper or magazine (or the like, including electronic media), applicant's first invention and present invention could make it essentially impossible for anyone to approach every relevant witness-server with the expectation of successfully causing alteration to every witness-server's stored archive, for example to substitute a different DFP in place of the authenticate DFP.

Much flexibility can be employed in generating a DFP. For example, as shown in FIG. 2C, the extended DF output from the configuration of FIG. 2B can itself be passed through one or more additional one-way collision resistant hash functions such as CHFs 110-A, 110-B, . . . 110-N. For example, CHF-A 110-A might be an MD5 function, CHF 110-B might be an implementation of Ralph Merkle's SNE-FRU algorithm, and so on. Any or all of the independent results from 110-A, 110-B, . . . 110-A might be concatenated or otherwise combined together to produce the final digital fingerprint (DFP). As with the embodiments of FIGS. 2A and 2B, bit-padding may also be employed. For example, in FIG. 2C, if CHF 110 outputs a 160-bit value, pad mechanism 115 might augment the number of output bits to perhaps 180-bits to 200-bits. If CHF-A 110-A happened to produce an output of 180 bits, padding its output to, say, 200 bits would enhance high system entropy by preventing a third-party from examining a particular DFP value and deducing which specific CHF was used in its construction, e.g. CHF 110, or CHF-A 110-A. As noted, the pad bits may be quasi-randomly generated.

DFP values generated as described above and elsewhere with respect to applicant's first invention may also be used with the present invention, which will be described more fully herein, especially with respect to FIGS. 6–15B. For example, FIG. 10A, described later herein, more explicitly shows use of an optional initialization vector (IV) during DFP generation, which DFP may be used with the applicant's first invention or with the present invention. Creating a DFP by seeding the CHF with a quasi-randomly selected initialization vector (IV) before inputting the DF associated with the original document helps ensure that DFP values are unique, even when created using the same original document. Although use of an IV is optional, if an IV is used, the IV will be promulgated along with the DFP.

If desired, the function(s) used to provide a CHF transformation yielding a DFP may be made known to the registrant and indeed to the general public. Alternatively, in a preferred embodiment, the registrant could select the CHF to be used, and indeed the registrant could be allowed to devise a CHF that would be used. (Of course the same CHF would have be to available at some later date to authenticate that the original document was not altered.)

Thus, while a user-registrant could calculate the DFP associated with a given DF using any given CHF, preferably the CHF function(s) are provided through the use of a dedicated program, application, or even a user-friendly appliance made available to the public for this purpose. Such appliance would yield a DFP value based upon the document DF, and this DFP would be used to register the document in question. In an alternative embodiment, the program or tools necessary to provide a CHF can be obtained by the registrant from a nexus-server or from a witness-server. If desired, the DFP can be calculated through the independent efforts of the user-registrant, provided that such a transformation produces a DFP derived from at least one one-way CHF. Within the context of applicant's first invention or of the present invention, any such transformations are also deemed to be a CHF. Of course the method by which the DFP was calculated would have to be available at some later date to authenticate that the original document was not altered. Indeed, the function(s) used to provide a CHF transformation yielding a DFP may be made known to other registrants, and even to the general public. So doing can help ensure that the functions are available at some later date, and also demonstrates that the present invention does not rely upon keeping secret the manner by which a DFP was calculated.

It is noted that the use of a cryptographic hash function as contrasted with use of an encryption function provides many benefits over prior art techniques. For example, while certain encryption algorithms may be subject to governmental export or import regulation, no such regulations are believed to apply to a CHF. Also, for a given level of computer processing overhead, CHFs can be more efficiently used than encryption functions. Finally whereas encrypted documents may be vulnerable to various forms of cryptanalysis that could result in the unauthorized decryption of the document in question, cryptographic hash functions are believed not to have such vulnerability.

As noted, DFP 120 may be generated from a DF using a service or system, and a user-registrant can deliver or transmit, or cause to be delivered or transmitted, the DFP to a witness-server. The user-registrant selected witness-server that receives and promulgates the DFP is denoted as the primary witness-server (PWS). The PWS will exchange its storage records with all other WS in a cluster of witness-servers, thus promulgating the DFP to at least a desired number of recipient servers or witness-servers in a networked cluster of servers for storing. As noted, once the DFP has been successfully promulgated to at least a minimum number of witness-servers, it is no longer possible for someone to alter the original document and reasonably expect such alternation not to be demonstrable. This promulgation occurs substantially in real-time. This is in contrast with a not necessarily real-time synchronization process by which WS that did not initially receive the promulgated information can obtain the information from other WS within the cluster that did receive the information. The synchronization aspects of applicant's first invention and of the present invention are described more fully later herein.

Figure 3:
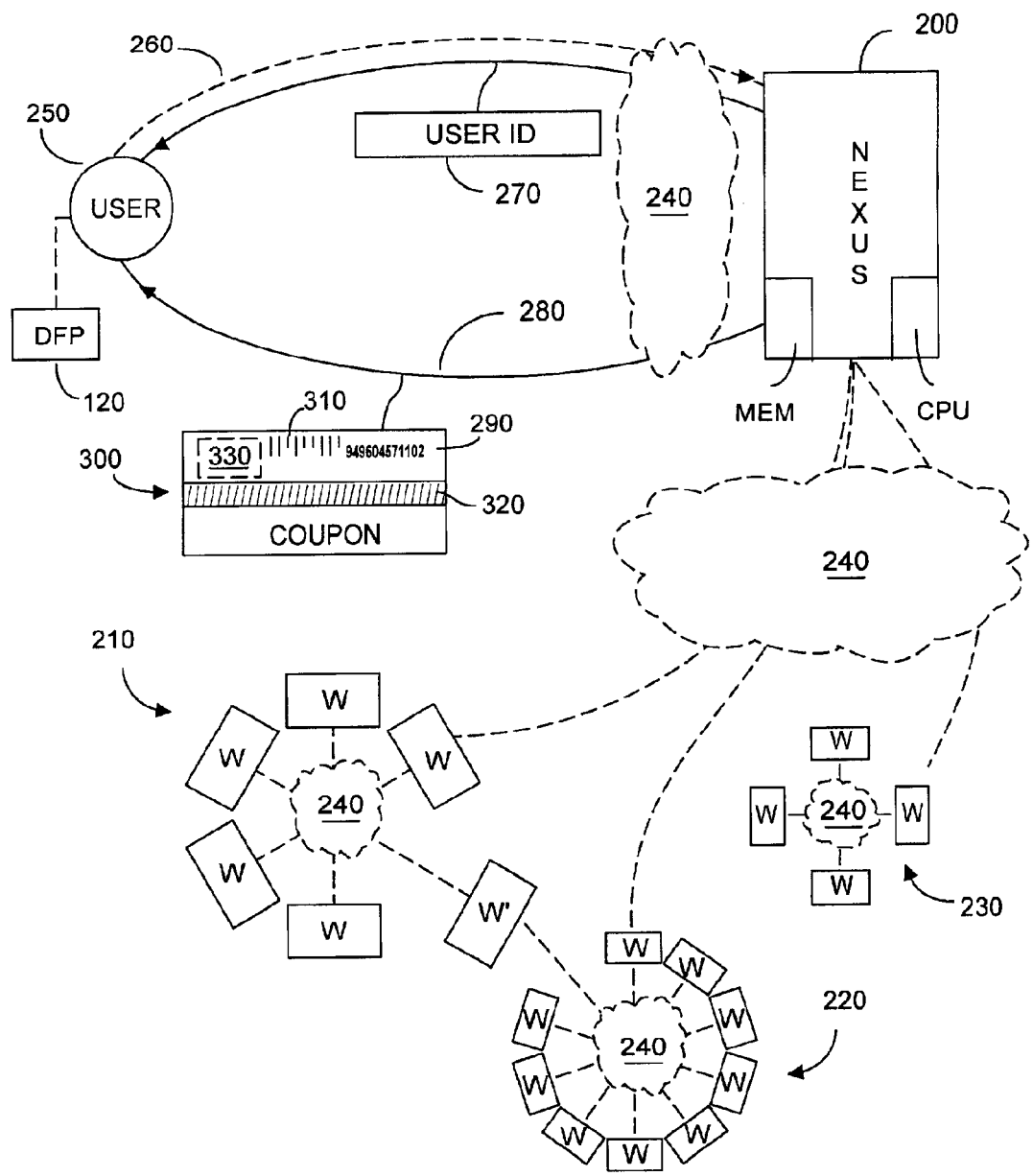
FIG. 3 depicts elements of a system, according to the applicant's first invention.
Figure 4:
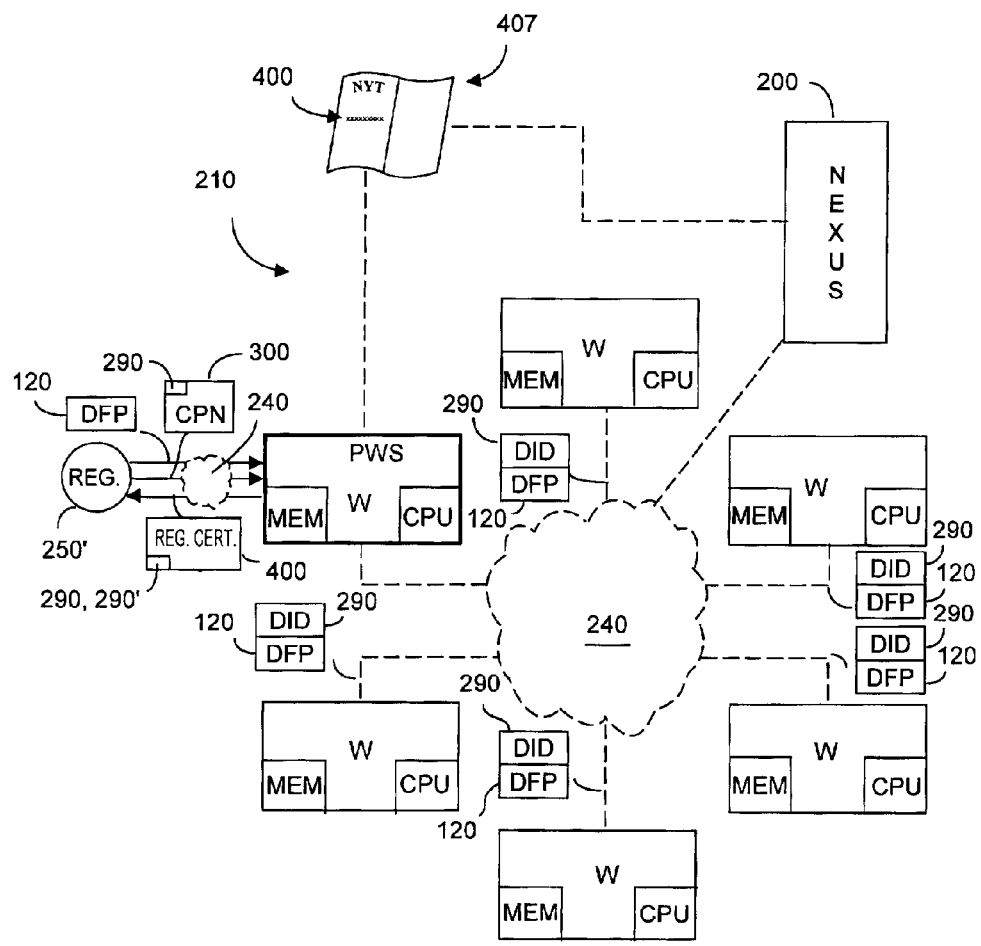
FIG. 4 depicts a registration protocol including registration certificate creation and digital fingerprint distribution to a quorum (or subset) of Q witness-servers in a cluster of available witness-servers, according to applicant's first invention, and as may be used with the present invention.

Referring now to FIG. 3 and FIG. 4, applicant's first invention and the present invention include an administrative overseer system 200, referred to herein as a nexus-server, and at least one cluster 210, 220, 230 of witness-servers, denoted as "W" FIG. 3. As best seen in FIG. 4, preferably the nexus-server and each witness-server is a computer system that will include at least a central processor unit (CPU) and memory (MEM) that can provide persistent and also volatile storage.

As indicated by FIG. 3, clusters may vary in size, e.g., cluster 230 has four witness-servers, whereas cluster 220 has ten witness-servers. For ease of illustration FIG. 3 depicts three clusters, but in practice there may be hundreds or many thousands of clusters, and the number of witness-servers in a cluster may vary from perhaps three to a hundred or more. Further, each cluster operates under a set of applicable rules and procedures, under supervision of the nexus-server responsible for that cluster. Note that a given witness-server, e.g., W', may be a member of more than one cluster, e.g., cluster 210, cluster 220, etc. Of course witness-server W' must be qualified according to the rules and procedures applicable to every cluster of which it is a member. In the preferred embodiment, any number of witness-server storage facilities can cooperate with each other under an agreed upon set of characteristics, so as to create an instance of a distributed information system, according to applicant's first invention or present invention. These witness-servers will operate under a common set of rules and behaviors to form a cluster of witness-servers, sometimes referred to as a witness cluster or cluster of witness servers.

As shown in FIGS. 3 and 4, nexus-server 200 can communicate bilaterally with each cluster via medium 240, which may include, without limitation, any or all of the Internet, networks, wires, optical fibers, wireless communication (IR, RF, etc.). It is not required that nexus-server communication with all clusters using the same medium, or that witness-servers communicate with each other using the same medium. Thus, nexus-server 200 might communicate with cluster 210 wirelessly, communicate with cluster 220 using fiber optic cable, and communicate with other clusters over the Internet using wire cable. The witness-servers within a cluster can communicate with each other, preferably through a medium 240, which may include any or all of the communication modes noted above. All witness-servers, e.g., PWS and WS, in cluster 210 contain memory and CPU functions, and can communicate with each other and with nexus-server 200, e.g., via communication medium 240. Preferably the clustered witness-servers thus "see" each other securely, and connections between witness-servers in a cluster can be routed over any type of network technology, TCP/IP among other protocols. A property associated with use of transmission medium 240 is that information will eventually be delivered to each intended recipient, e.g., WS, or if delivery does not occur, the sender will be informed of the non-receipt and can act accordingly.

Referring again to FIG. 3, an entity 250 (e.g., a user-registrant) wishing to register a document, now or later, will obtain from nexus-server 200 a preferably quasi-randomly issued user ID (UID) 270. The UID preferably will comprise a large number of bits, perhaps 160-bits or more, and this bit size may be padded, if desired. The UID may be requested and received via medium 240, if desired. Periodically the nexus-server may issue users new UID numbers, to intentionally limit the amount of time during which any given UID can be used to register documents. The nexus-server is also responsible for ensuring that each document that is registered with the present invention will have an associated document ID (DID) 290 that preferably also is quasi-randomly generated and guaranteed to be unique among all other DID numbers. Each DID issued by the nexus-server is associated with the UID of the individual or organization who obtained it, and thus any given DID is uniquely associated with one and only one UID. Stated differently, a registrant presenting a document to a primary witness-server, PWS, for registration may have multiple UIDs, but a document can only have one DID, and that DID will be associated uniquely with one UID.

The DID is used by the nexus-server to track document registration information maintained within the distributed system. As such, the DID plays a primary role in ensuring that information containing the specific characteristics unique to any particular registered document is organized, stored, and is retrievable. A system according to applicant's first invention and the present invention exhibits high entropy, which is promoted by the randomness with which the nexus-server preferably creates and issues UID and DID values. Thus, any third person somehow acquiring knowledge of the UID and DID does not learn from these random numbers anything meaningful about the registrant or the nature or contents of any document. Any information regarding the actual identity of the individual or organization associated with a given DID is maintained by the nexus-server, and is intentionally not shared or distributed to any witness-servers. Hence, witness-servers are limited in their ability to use these values to identify a registrant or user, and cannot ascertain any useful information regarding the identity of the registrant or user registering a document within the system. The UID and DID numbers themselves are simply meaningless outside of the context of the present invention.

Although UID and DID numbers preferably are generated randomly, those skilled in the art will appreciate that true randomness can be difficult to obtain. Thus, in a preferred embodiment, the UID and DID preferably are at least quasi-randomly generated, e.g., their "randomness" may be less than perfect. However, it will also be appreciated that even if the UID and/or DID were generated non-randomly, perhaps even sequentially, applicant's first invention and the present invention would still function as intended. However if a non-randomly generated UID and/or DID value fell into the hands of a third person, such third person might perhaps be able to deduce certain information. For example, the third person might glean when in time, or perhaps where geographically, such values were generated. If a large number of DIDs were issued to a single user, the third person might glean some detail identifying the customer. Nonetheless, even if such information were gleaned by a third person, applicant's first invention and the present invention would still function as intended. Advantageously, the preferred use of at least quasi-random assignments increases system entropy and protects against third persons learning even such relatively useless information.

As used herein, a "coupon" 300 is a validly issued DID value 290 that has not yet been used to register a document; once used to register a document, the coupon is converted into a so-called registration certificate 400. In applicant's first invention, as part of its system oversight responsibilities, when nexus-server 200 issued a coupon 300 containing a DID value 290, it so advised witness-servers in the relevant cluster, e.g., witness-servers W in cluster 210, for example via medium 240. The witness-servers can then pre-allocate memory and other resources preparatory to fulfilling their obligations as storage facilities for DFP information. The total number of coupons issued is known to the nexus-server. Since DFP value size, padded or otherwise, can be calculated, the nexus-server can ascertain from the number of unredeemed coupons whether sufficient witness-server memory is available among the various clusters within the system. If insufficient, the nexus-server can alert the witness-servers to increase their storage capacity, according to the terms of all relevant nexus-server and witness-server agreements and warranties. The use of coupons 300 can also permit the nexus-server to ascertain whether forged coupons are being presented by putative registrants. This follows since the nexus-server knows what UID 270 is associated with each DID 290 contained in each coupon 300, and can control the level of authentication, if any, necessary to redeem coupons.

In exchange for consideration that may include monetary payment communicated via path 260, nexus-server 200 will issue user 250 one or more coupons 300, as indicated by communication path 280. Each coupon 300 will bear the DID 290, but will not bear the UID 270. However within its memory system, nexus-server 200 will keep a record of what DID values numbers were given to which UID values. The nexus-server apparatus that issues the UID 270 and coupon 300 may be implemented as a user-friendly appliance, perhaps located at a drugstore or a bank. The user could input money or a credit card into the appliance, and the appliance would dispense a UID and, then or later, one or more coupons 300, in the fashion of an ATM for example.

A coupon will have been obtained for registration use with a given cluster, whose rules and procedures dictate the minimum quorum number (Q) of witness-servers in the total number (N) of witness-servers in the cluster that are required for registration of a DFP. Cluster rules and procedures also dictate the length of time promulgated DFP values are to be archive-stored, authentication rules, operational requirements, and so forth.

A coupon is tantamount to a nexus-server promise to permit a user-registrant to submit and register a document with applicant's first invention or with the present invention, subject to applicable rules and procedures relevant to the cluster selected. The worth or cost of the consideration paid for a coupon can determine the nature and quality of the relevant clusters. Thus, the value of a coupon may be commensurate with the desired level of evidentiary proof and/or the time period for which the coupon purchaser desires the proof to be available. For example, an especially valuable coupon might entitle registration with a cluster comprising perhaps twenty witness-servers, each of which is associated with a long established accounting institution of impeccable reputation, for a time period of perhaps fifteen years. A less valuable (e.g., less costly) coupon might entitle document registration with a cluster comprising fewer witness-servers, or perhaps an even greater number of witness-servers, but witness-servers of less esteemed standing in the community (e.g., witness-servers associated with a brand new company), or witness-servers in a cluster whose rules and procedures require archive storing for a shorter period of time.

Without limitation, cluster rules and procedures can also dictate nature and quality of archiving in the sense of how and where information shall be stored by the witness-servers, e.g., in a secure vault, in redundant persistent storage devices, in widely geographically separated storage locations, including locations in different legal jurisdictions or even different continents. Further, as described herein, rules and procedures governing a cluster might require high levels of personal identification from persons seeking to use the present invention. Other rules and procedures may dictate a guaranteed minimum number for Q and a minimum number for N. Thus, when it is desired to register a document, the registrant will select one (or perhaps more than one) cluster whose applicable rules and procedures appear to offer a desired level of protection.

In applicant's first invention and in the present invention, different clusters of witness-servers may be said to represent differing DFP storage or archiving capabilities, commensurate with the value of a coupon 300. Because the operational rules that govern any given cluster are flexible, it is possible to provide clusters that require registrants to properly authenticate themselves prior to registering documents, for example by presenting a drivers license or passport form of identification. Such requirements can help prevent the unauthorized used of coupons, and can also allow system to verify both authenticity of the document, and identity of the registrant, where presumably the registrant is the document author, or at least someone acting on the author's behalf. Either invention flexibly allows for the possibility of varied types of authentication, but without compromising system ability to generate registration certificates necessary to verify the authenticity of documents registered within the system.

Coupon 300 may take many forms and it is not required that DID 290 be printed on a paper or plastic substrate per se. Thus, DID 290 might, without limitation, be barcoded (one-dimensionally, two-dimensionally, or otherwise) on a suitable substrate, it might be represented magnetically as on a strip 320 or with magnetic ink or even barcodes 310, or it might be stored within an integrated circuit or other structure 330 that can be interrogated to read the stored contents. If desired, DID 290 could even be stored as acoustic or other patterns. The document(s) whose DFP value 120 will be promulgated and stored by WS need not yet exist at the time a user-registrant obtains DID 290 and coupon(s) 300. Note that coupon 300 does not itself include or contain any secret information that if divulged would somehow compromise integrity of either invention.

Turning now to FIG. 4, a user-registrant 250' (who need not be the user or entity 250 that purchased coupon 300) will present coupon 300 and DFP 120 to a witness-server, here a member of cluster 210. As noted, DFP 120 may have been generated elsewhere, perhaps by the user-registrant, or may be generated using an appliance conveniently located relative to the PWS. The user-registrant may present the coupon to any witness-server in the cluster 210 that is willing to accept coupons. The WS accepting coupon 300 and DFP 120 is denoted as the primary witness-server (PWS), and is depicted with bold lines in FIG. 4. Note that while not all WS may wish to accept coupons and be a PWS, all WS within a cluster must receive and store a promulgated DFP and DID values, according to the registration and certificate synchronization protocols described herein.

Thus, preferably the user-registrant will have already generated the DFP for the document to be registered (by their own efforts or by using a tool or appliance obtained from the nexus-server or the PWS), and will submit the DFP with a valid unused coupon to a PWS. According to one embodiment, the PWS need not require that the user-registrant provide personal identification, nor is it required that the registrant be the same individual or entity that originally obtained from the nexus-server the coupon that is now being presented. The user-registrant is merely the person or entity registering a document with a given WS, and as such need not have or obtain an UID. Alternatively, as described later herein, a coupon or a cluster may require personal authentication to redeem a coupon.

In a preferred implementation, the method by which such authentication takes place would be accomplished by one or more authentication services. For example, a Radius server such as might be provided as described in RFC-2058, or a Security Dynamics ACE/Server. Said authentication servers may be provided by either the nexus-server or by the cluster that might require user-registrants to be authenticated or strongly authenticated.

Figure 5:
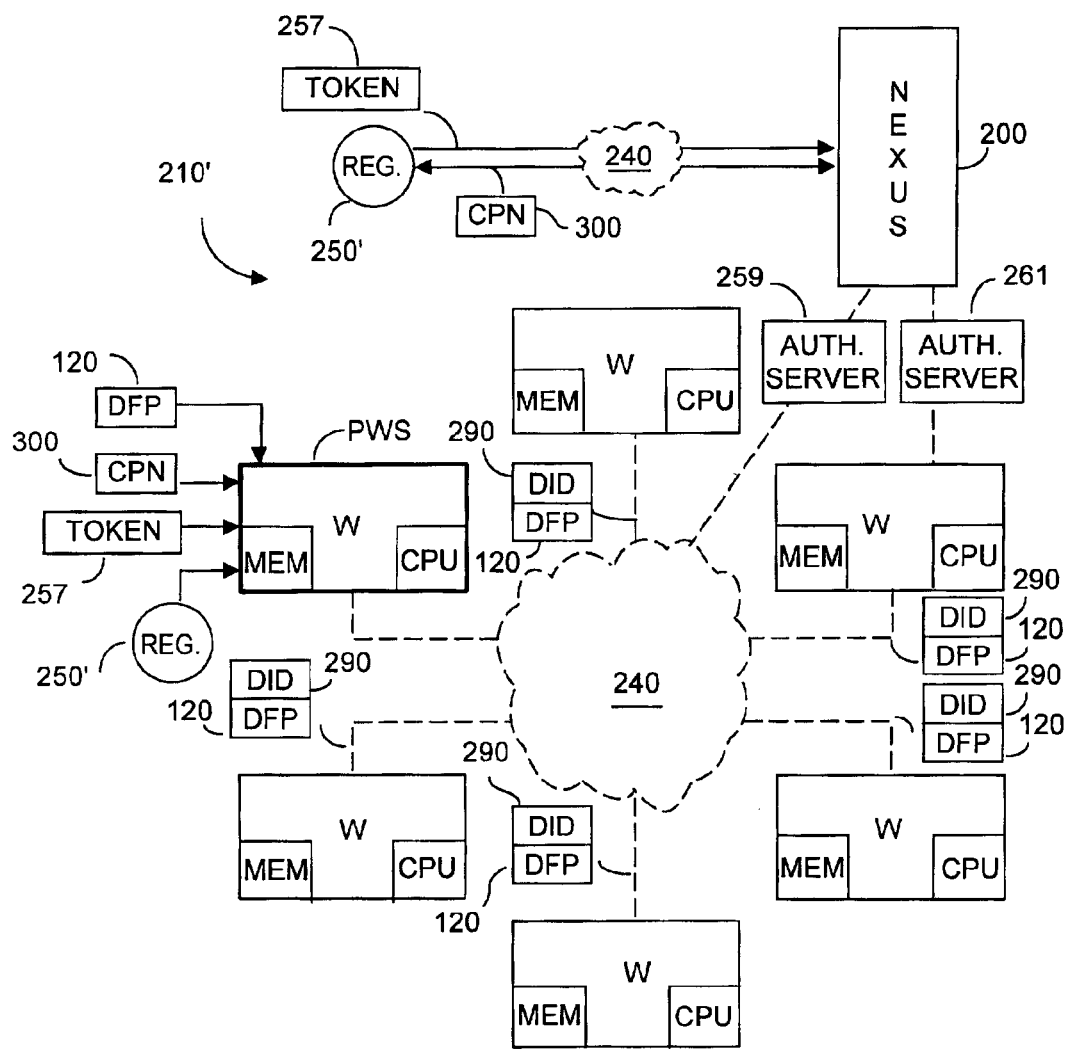
FIG. 5 depicts exemplary forms of registrant authorization, according to applicant's first invention, and as may be used with the present invention.

Referring now to FIG. 5, a cluster 210' is shown, wherein applicable rules and procedures require some form of personal identification to obtain a coupon, and require some form of personal authentication to later redeem a coupon. As shown in the upper portion of FIG. 5, an individual or user-registrant 250' wishing to obtain a coupon 300 from nexus-server 200 for use with cluster 210' is required to produce some form of personal identification before the coupon can be issued. Any number of techniques may be used, including without limitation the use of single-factor and two-factor authentication, e.g., shared authentication secrets (passwords, pass phrases, etc.), challenge-response systems (secret question-secret answer challenges), and one-time password authentication systems (Bellcore's S/KEY system, Security Dynamics' SecurID tokens). Preferably, authentication would take place through a communications medium 240, using cryptographically secure protocols such as, but not limited to, SSH, SSL, or TLS. Preferably authentication would also involve the issuance of a token, apparatus, or other mechanism for personal identification.

In FIG. 5, an authentication server 259 may be associated with nexus-server 200, or an authentication server 261 may be associated with cluster 210'. In either configuration, the relevant authentication server must be trusted by both the nexus-server and the cluster. Assume that user-registrant 250' wishes to obtain a coupon 300, but must authenticate identity because of the rules and procedures associated with the desired cluster 210'. Previously the user will have been issued a token, apparatus (a card, a so-called smart card, a peripheral device, a so-called dongle, etc.), or other identification mechanism 257 by one of the authentication servers 259, 261. User-registrant 250' will communicate the token 257 information to the relevant authentication server 259, 261, e.g., via medium 240 and more preferably via a cryptographically secure protocol, and via nexus-server 200. If the authentication server advises the nexus-server that the token is genuine, the nexus-server can presume that user-registrant 250' has authenticated identity. At this juncture, user-registrant 250' may obtain coupon 300 for use with cluster 210' in a coupon-obtaining fashion as was described earlier herein.

Assume now that user-registrant 250' wishes to redeem coupon 300, and approaches a PWS within cluster 210'. Armed with coupon 300 and token 257, user-registrant 250' will authenticate his/her/its identity to the satisfaction of the PWS using the relevant authentication server 259. If and only if the authentication server verifies user identity will the PWS accept coupon 300 and DFP 120 for registration. User-registrant 250' may be communicating with the PWS via medium 240, using an Internet HTTP browser with SSL or TLS support. As such, instead of or in addition to token 257, any of the various authentication systems supported by the browser might be employed, including the use of HTTP authentication, i.e. RFC-2617, client-side digital certificates, etc.

With or without being required to authenticate the identity of a user-registrant, upon being presented with a coupon, the PWS can generally determine whether the coupon is valid and redeemable. The PWS can do so using information previously distributed to the witness-servers in the cluster by the nexus-server at the time the coupon was issued. But, if the PWS is unable to make this determination, perhaps because the coupon is quite new and the nexus-server has not yet finished propagating this information throughout the cluster, the PWS may poll the nexus-server directly to establish that the coupon can be properly "redeemed".

Since the nexus-server knows what UID is associated with each coupon, if necessary the nexus-server can elicit information from the registrant in realtime to confirm the coupon bona fides. Alternatively, as a matter of goodwill it may be nexus-server policy to register DFP 120 even if the coupon is questionable, since the bona fides of the coupon can be more fully investigated at a later date. Preferably communication between the nexus-server, the PWS, and the other witness-servers within cluster 210 is over a secure communication channel, such as a VPN, using medium 240. As used herein, communications medium 240 (see FIGS. 3 and 4) may, but need not be, a secure communications channel. Such VPN or similar secure communication can help protect integrity and authenticity of all synchronization and auditing information exchanged between the witness-servers in the cluster and the nexus-server. However, less secure communications including TCP/IP and cryptographic techniques can instead be used to protect the integrity of such communications.

Referring still to FIG. 4, coupon 300 will have been obtained for registration use within a given cluster. The rules and procedures associated with that cluster will dictate the minimum quorum number (Q) of witness-servers in the total number (N) of witness-servers in the cluster required for registration of the DFP. Further, the rules and procedures will specify the nature and quality of the DFP registration storage-archive to be provided. Stated differently, within each cluster there must be at least a minimum quorum number of witness-servers that agree to cooperate with each other to register a document, and no PWS can complete document registration unless the DFP can be successfully promulgated to at least this minimum number of other witness-servers. The quorum number can be different for different clusters, but remains fixed within any given cluster. In the preferred embodiment, the PWS randomly or quasi-randomly selects a quorum from the total number of witness-servers available in the cluster. It is permitted that the PWS count itself as part of the quorum number Q.

Note from FIG. 4 that the various witness-servers in a cluster communicate via a medium 240 that permits the witness-servers to be physically quite distant from each other. As such, the number of witness-servers in a cluster can (but need not) be exceedingly large, e.g., a hundred, a thousand, ten thousand, if not more. In practice, there is no real upper limit on the size of a cluster. For example, perhaps any registered user of a popular website could agree to be a witness-server for some nominal fee per each document witnessed. The number of such witness-servers could indeed be exceedingly large.

The PWS promulgates the DFP and coupon via medium 240 to at least Q witness-servers and obtains confirmation from each recipient witness-server acknowledging that the DFP and coupon were received successfully. Each CPU in each witness-server has a clock function and will time-stamp receipt of the promulgated DFP and associated information. As soon as the PWS receives confirmation, including time-stamp information, from at least Q of N witness-servers in the cluster, it converts coupon 300 into a registration certificate 400 that will be given to the registrant. (Preferably such confirmation occurs substantially in real-time, but could occur over a longer time period.) In addition, the PWS promulgates the registration certificate within the cluster to at least the same Q witness-servers. Note that registration is not complete until Q confirmations are received by the PWS. The registration certificate 400 issued by the PWS will bear a registration certificate ID number that may be (but need not be) identical to the coupon ID number. Stated differently, the coupon and registration certificate each contain a DID value, but this need not be the same DID value. Thus, FIG. 4 shows registration certificate 400 bearing an ID value that may be 290, or a completely different value, denoted 290'. The registration certificate is a representation by the present invention that the DFP submitted by the registrant was promulgated to a minimum Q of N witness-servers within the relevant cluster.

As shown in the upper portion of FIG. 4, if desired, nexus-server 200, a witness-server W, or a PWS, can cause the information contained in registration certificate 400 to be published in at least one widely distributed archived medium 407, e.g., *The New York Times, The London Times, The Wall Street Journal*, etc. Such publication would be a severe deterrent to any person desiring to compromise the storage archive maintained by every relevant witness-server. Stated differently, even if such person could learn the identity of every relevant witness-server, the fact that the registration certificate information desired to be altered by such person is also irrevocably and untraceably distributed to an extremely large number of redundant potential witnesses renders useless an attempt to compromise the witness-servers.

As part of its duties, the nexus-server supervising this cluster periodically verifies that each witness-server within the cluster is maintaining the same time with respect to each other, perhaps collectively referencing GMT/UCT. Since each recipient witness-server should have essentially the same clock time, the time-stamp can provide useful evidence supporting authenticity of the DFP value later retrieved from memory by the various witness-servers in a cluster. Each such confirmation will contain a time and date stamp showing when the individual witness-servers received and completed registration of the document in question.

Preferably the Q witness-servers will have been selected by the PWS quasi-randomly from the larger number of N witness-servers available within the relevant cluster. Thus in FIG. 4, assume that coupon 300 entitles registration among witness-servers in cluster 210. There are a total of N=6 witness-servers, and assume that the quorum number is Q=4. Q is intended to be sufficiently large, commensurate with the coupon value, so as to preclude collusion among the witness-servers who receive the DFP. The magnitude of N can take into account the nature and quality of the witness-servers, e.g., certified public accounting firm witness-servers may be considered so trustworthy that a smaller total number of such witness-servers can suffice within a cluster.

In any case, N should be sufficiently large to effectively eliminate an agreement among all recipient witness-servers to delete DFP 120 and instead substitute an agreed upon different value DFP' for DFP. For example, an altered document might be created and used to produce a DF'. DF' might then be processed with the same CHF function(s) used for the original document to now yield a value DFP'. As described below, the DFP will be registered by the Q witness-servers as part of a so-called registration certificate 400.

As soon as the PWS can confirm successful promulgation of DFP 120 and coupon 300 to at least a minimum quorum number Q of witness-servers within the relevant cluster 210, registration is complete, and coupon 300 may be said to be redeemed. At that juncture, the PWS converts the coupon to a registration certificate 400, which is returned to the registrant for possible later use in establishing that the original document whose DFP is stored within the system has not been altered. Registration certificate 400 will contain the DFP value that was registered, identification of the CHF procedure(s) used to generate the DFP, a DID, the coupon ID (which may differ in value from the DID), the list of Q witness-servers initially agreeing to register the DFP, the timestamp confirmations received as acknowledgments (or ACKs) from each witness-server comprising the quorum Q, and some indication as to the cluster within which the document was registered. Registration certificate 400 is the registrant's confirmation that coupon 300 was successfully redeemed and that document 20 was registered according to the terms of the cluster for which the coupon was issued. As used herein, a timestamp includes time, which is understood to also include date. Within the present invention, each Q witness-server receiving a DFP timestamps its receipt, and the DFC will include the timestamp from each of the Q witness-servers. A commonality of reported times from the different timestamps in the registration certificate (or DFC) can provide a measure of confidence that the promulgation of information to the Q witness-servers occurred at an agreed upon point in time.

After completing the registration protocol, each witnessing witness-server ensures that the registration certificate is properly distributed to all remaining witness-servers within the cluster. This typically not real-time process is referred to herein as certificate synchronization or as the certificate synchronization protocol. Such synchronization among the witness-servers ensures that each has an accurate copy of all registration certificates. For the purposes of synchronization, the initial quorum of witness-servers that is established for each registration certificate is treated as authoritative. These Q witnessing witness-servers distribute copies of their registration certificates to the remaining witness-servers that were not part of the initial quorum. This redundancy thus provides copies of the registration certificate with witness-servers that did not originally participate in the registration. The nexus-server monitors each of the storage facilities comprising each witness-server and ensures that certificate synchronization takes places according to the operational and archiving rules relevant to the cluster in question.

Each witness-server participating in the registration protocol maintains a so-called propagation vector for each registration certificate it participated in registering. Further, each such witness-server is responsible for tracking the propagation status of each certificate it has witnessed throughout the remaining (N-Q) witness-servers in the relevant cluster.

The propagation vector maintained by each of the Q witness-servers will have several entries that can be in one of several states. For example, an "unsent" state means the coupon has not yet been sent to another witness-server. An "unacknowledged" state means the coupon has been sent but no confirmation has been received. An "acknowledged" state means another witness-server has confirmed its receipt of the sent coupon. Nexus-server 200 can query these vectors during a compliance confirming phase of the protocol governing the overall system, defined by the present invention.

At this juncture, certificate synchronization has occurred, and, as noted, the document submitted by the registrant to a system according to the present invention has been successfully registered within the cluster. It is no longer possible for any person (including the document author, the user-registrant, among others) to alter the underlying document and expect to demonstrate that no alteration occurred. Any subsequent changes to the original document, intentional or otherwise, would make it exceptionally difficult if not outright impossible for the DFP of the altered (or putative) document to be identical to the DFP of the original document that was successfully registered by the registrant within the cluster.

Assume that at some later date it is necessary to verify the authenticity of a document registered within applicant's first invention, or the present invention, and for which a registration certificate is available. Stated differently, assume it is desired to determine whether a putative document is indeed the original document 20 registered with the present system, or is some altered version of that document, (or indeed another document).

Document verification can be undertaken in a procedure similar to document registration. Similar method steps may be carried out, with the notable difference that instead of presenting a coupon to the PWS, the person or entity desiring to verify a document presents a registration certificate 400 to a witness-server that is a member of the cluster with which registration occurred and that can act as a PWS by accepting requests for document registration or for verification. Using information contained in the registration certificate, this PWS can determine the identical original CHF procedure used when the document 20 was registered.

Referring now to FIGS. 2A–2C, a DF' 10' representing the putative document (which may in fact be the original document) is processed using the same at least one one-way collision resistant hash function(s) that was used to generate the original DFP. Thus, if the configuration of FIG. 2A was originally used, putative DF' 10' will be processed through CHF 110 and, if padded in bit-length, will be similarly padded at this time. Let DFP' be the output value from CHF 110. FIG. 2A is exemplary and if the configuration of FIG. 2B, 2C or some other transformation configuration was originally used to output DFP, the same transformation configuration will be used now.

The DFP' from the putative document is now known and can be compared to the DFP contained within the registration certificate that is archive-stored by the PWS, or indeed by any of the witness-servers in the cluster. The registration certificate DID value is retrieved from the registration certificate by the PWS and, in a preferred embodiment, is transmitted to all of remaining witness-servers in the cluster. Using this DID value, the witness-servers locate and retrieve the registration certificate and associated DFP value archive-stored with each witness-server's persistent-memory. Each witness-server then communicates the retrieved certificate and DFP value, e.g., via medium 240, back to the PWS that initiated the request.

The stored DFP value from the witness-servers is compared to a DFP' value newly generated from the putative document (the document alleged to be the unaltered original document). If there is agreement between the original DFP value provided by the witness-servers and the newly generated DFP value, the putative document is the unaltered original document. It is possible that not all the witness-servers will retrieve and provide the exact same DFP value. For example perhaps a storage problem in one or more of the witness-servers has corrupted the stored DFP value. Perhaps fire or other calamity has destroyed one or more of the witness-server storage facilities. Nonetheless, if a sufficient number of witness-servers return the same DFP value as recently generated value DFP', it may be asserted that the putative document is authentic and has not been altered.

If desired, the entity or person in possession of the registration certificate and desiring to authenticate the putative document can examine the registration certificate directly using software or tools available from the nexus-server. Using such tools, such entity or person can transmit the DID value of the registration certificate to any or all of the witness-servers in the cluster. Using this DID value, each witness-server can locate and retrieve the registration certificate and associated DFP value that it archive-stored, and can communicate the retrieved information, e.g. using via medium 240, back to the requesting entity.

In the various embodiments of applicant's first invention and indeed in the present invention, the number of retrieved DFP values that should be in agreement to provide a high confidence level may be a function of the criticality of establishing document authenticity. If the document is a contract involving a billion dollars, then perhaps a dozen or more witness-servers might be required to retrieve the same DFP, which is equal to the now generated DFP'. If the document has less value associated with it, perhaps less agreement would suffice.

Clearly if all the witness-servers retrieve the identical DFP value as the value DFP' obtained from the putative document, then clearly the original document has not been altered. But if none of the witness-servers retrieves a DFP value that is the same as the DFP' value now generated from the putative document, there is strong evidence that the original document has been altered. Of course in another scenario perhaps a few but not all of the witness-servers may respond with a DFP value that is the same as DFP'.

Given the believed impossibility of creating a putative document whose DFP' could be a predetermined value DFP, agreement of at least two witness-servers as to a common value DFP equal to DFP' would appear to be meaningful factual evidence that the putative document may be genuine.

The minimum number of witness-servers that must retrieve identical DFP values is determined by the rules and procedures governing each cluster, and will have been taken into consideration by the person or entity who purchased the certificate used for document registration.

Thus, by promulgating the original DFP to a sufficiently large number of witness-servers, where "large" is determined by the user when purchasing the coupon, it is assured that at least some of the witness-servers will be available to retrieve their stored DFP values, should the need arise. As noted, it is foreseeable that over time, years perhaps, one or more witness-server storage facilities and back-up facilities might be impaired or even destroyed. Nonetheless, a sufficient number of witness-servers will remain, due in part to the redundantly distributed manner in which the DFP values are stored throughout the system, using the preferred registration protocol and certificate synchronization protocol.

Confidence in the significance of agreement in the DFP values retrieved from the system is incremental in that the greater number of identical retrieved DFP values can imply more weight to be given to the implications. If many of the returned DFP values agree with a DFP obtained now (using the same CHF) from the original document, then it may be asserted with some confidence that the original document is not altered.

Confidence in system integrity is promoted by the nexus-server periodically auditing that witness-servers are indeed carrying out their responsibilities. Such responsibilities can include compliance as to the nature and quality of the storage facilities (or memory) associated with each witness-server, including without limitation compliance with requirements as to the total storage capacity of each witness-server, and the percentage of such capacity already committed to storage including pre-allocated storage. Requirement standards will exist as to observed minimum and average bandwidth between the nexus-server and each witness-server, as well as average and minimum latency. The nexus-server will also confirm that overall integrity of each cluster of witness-servers is being maintained, including determining whether duplicate records exist for a given registration certificate, and whether the status of a given registration certificate is consistent across all witness-servers within a cluster. The nexus-server can also monitor synchronization among witness-servers within a cluster. Audit records gathered and maintained by the nexus-server may be made available in summary form to users and perhaps even the public at large. There is nothing secret in such information, but limiting distribution of the information would reduce vulnerability of the clusters to attack from hackers.

Synchronization of data between witness-servers can be carried out in many ways. Advantageously, the nexus-server notifies all witness-servers in a cluster about all coupons in circulation relevant to that cluster. Any of the Q witness-servers in a registration can notify all remaining (N-Q) witness-servers in the cluster as to coupon redemption and promulgation of registration certificate data. Such intra-cluster promulgation of information can occur in many ways, e.g., without limitation, each witness-server could broadcast-contact every other witness-server, or each witness-server could communicate in a round-robin sequential type fashion to the other witness-servers.

To recapitulate, each witness-server can let other witness-servers in a common cluster know about registration certificates it has issued in the capacity of primary witness-server. As noted, initially the primary witness-server in a cluster will distribute knowledge of the registration certificate ID numbers it has created. Any witness-server not in possession of a registration certificate ID number can be given same, and it is not necessary that every witness-server communicate with every other witness-server in this regard. The nexus-server can construct a graph-like communications infrastructure that connects each witness-server to several others such that each witness-server synchronized with, say, three other witness-servers, which then synchronize with three others, and so forth. Thus, promulgation from the primary witness-server to at least Q of N witness-servers occurs rapidly, but promulgation to the remaining (N-Q) witness-servers can occur in a round-robin style of synchronization. Ultimately, the nexus-server is responsible for monitoring all witness-servers within each cluster to ensure that each witness-server eventually does have a copy of all registration certificates within such time duration as might have been specified as part of the cluster-wide operation rules and warranties.

In summary it is seen that applicant's first invention provided a system and architecture that can be used to verify and authenticate types of information beyond what has been described herein. Advantageously, additional authentication mechanisms could be integrated into the described architecture without degrading the security provided by the original architecture. The described architecture and protocol enforced a separation of duty concept by which the roles and responsibilities of the nexus-server and of the witness-servers are independent; the information presented to each enforces a notion of a need to know. The use of coupons, registration certificates, and even time-stamps promotes the ability to verify accuracy of a registered document without revealing any information about the document itself. A high entropy level that minimized harm should any information stored in the system fall into the hands of unauthorized persons was provided. Such high entropy is evidenced in the hidden nature of customer identification and in the preferably random or at least non-deterministic selection of witness-servers to comprise a given cluster.

Having described applicant's first invention, primarily with respect to FIGS. 1–5, applicant's present invention will now be described with reference not only to FIGS. 1–5, but also to FIGS. 6–15B.

In applicant's first invention, system 210 created digital fingerprint (DFP 120) and digital certificate (400) information from the digital file (DF 10), and promulgated this information to multiple witness-servers. The promulgation created an audit-type trail that could permit reconstruction of the promulgation events throughout the system. In that system, a registration certificate 400 was created and contained sufficient information to perform document authentication, e.g., ensure that the promulgated DFP matches a more recently created DFP' from a putative document.

By contrast, the present invention can additionally store and promulgate at least DF information and digital fidelity certificate (DFC) information. In the present invention, DFC information preferably includes, in addition to information included in a registration certificate in applicant's earlier system, information to authenticate the user-registrant 250 causing document registration. In short, the present system can not only confirm that a document has not been altered, but can confirm identity of the user-registrant that caused the document to be registered with the present invention, which is to say, the present invention can confirm essentially authorship. As used herein, authorship properly denotes the person or entity causing registration since a document written by a user may in fact have been copied from another source. Other changes are also present. For example, in applicant's first invention, DIDs were distributed directly to client systems in the form of coupons. By contrast, in the present invention, DIDs are distributed directly to the PWS and allow user-registrants to submit $DFP_M$, optionally with credential information (C). In the present invention, a PWS assigns a DID at the beginning of the registration protocol, rather than requiring a user-registrant to have a valid DID before being allowed to commence the registration protocol.

Figure 6:
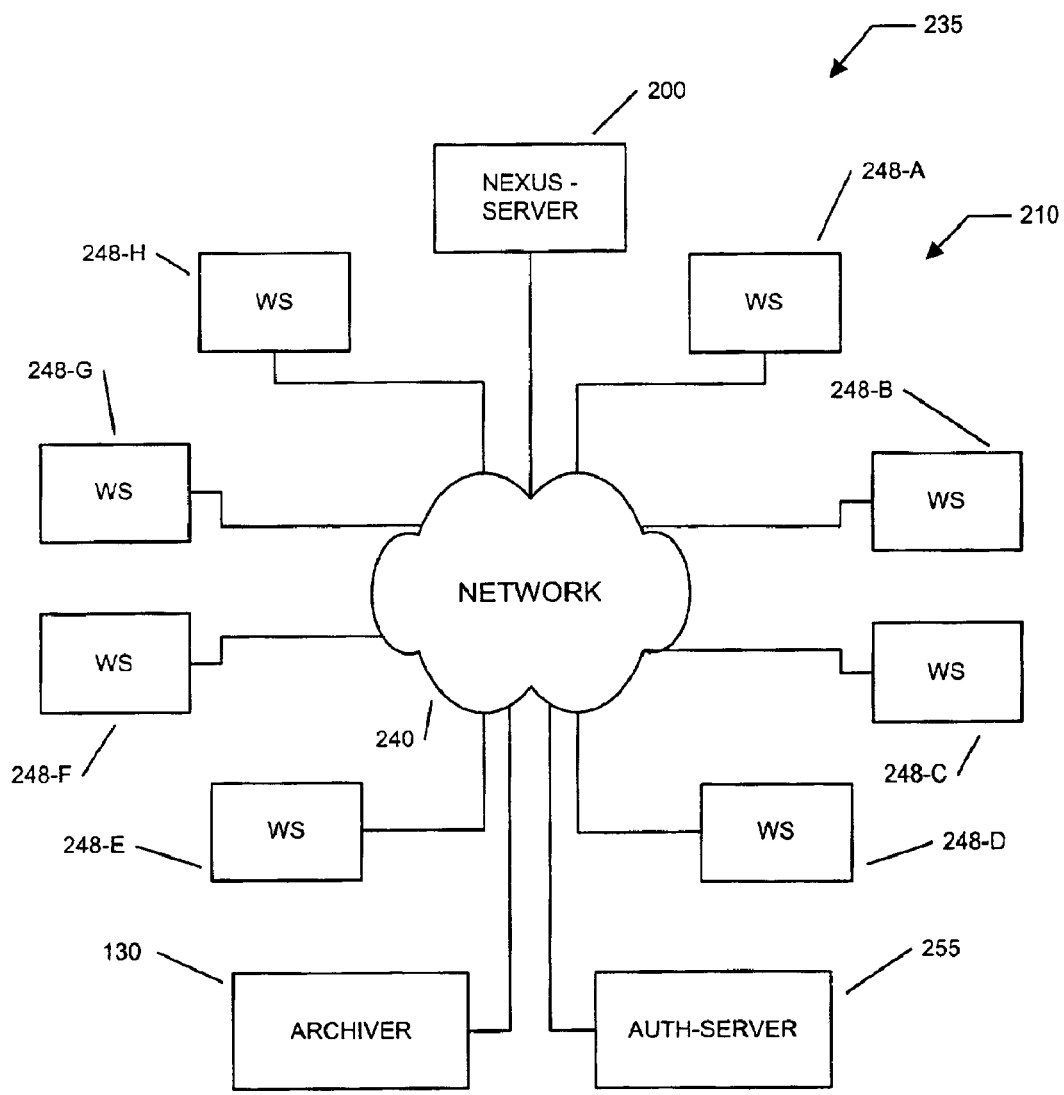
FIG. 6 is a block diagram of a cluster of witness-servers in a first embodiment of a distributed information system, according to the present invention.

FIG. 6 shows a distributed information system 235 that bears some similarity to applicant's first system depicted in FIG. 4. However system 235 in FIG. 6 preferably further includes an archiver (or archive-server) 130 and an authentication server 255. As used herein, it is understood that the sub-system components of each such system can interact with each other through the network of such sub-systems, using any viable means of information exchange. Witness-servers or WS or W in FIG. 6, are referred to as elements 248-A, 248-B, etc. It is understood that witness-servers 248-x in FIG. 6 may in fact be identical to witness-servers W, described with reference to FIG. 4, among other figures in the parent application. As such, each witness-server 248-x includes at least a CPU and memory, and (as indicated by FIG. 4, by FIG. 6, among other figures) means to communicate with a network 240 and, via the network, to communicate with each other. A cluster 210 of such witness-servers is depicted in FIG. 6, in which figure nexus-server 200 may be identical to nexus-server 200 in FIG. 4.

Archiver 130 in system 235 is coupled to communicate via network 240 with other system components also coupled to the network. Archiver 130 is a storage system, distributed or otherwise, that optionally can store the digital files (DF) that are processed with system 235. As such archive-server 130 comprises a large memory that can store perhaps hundreds of GBs, and more practically probably at least many terabytes (TB). Since long term storage of digital files is desirable (e.g., perhaps years if not many decades), archive-server 130 may include without limitation optical storage, magnetic storage, as well as future systems that will no doubt be developed to provide even more durable high density long-term storage capabilities.

As further shown in FIG. 6, system 235 preferably also includes an authentication server 255 that may be similar to authentication servers 259 and/or 261, e.g. as described with respect to FIG. 5. A function of authentication server 255 is to validate authentication credentials gathered from the user-registrant 250. The authentication-server 255 shown in FIGS. 6 and 7 may in practice be located anywhere where communications with network 240 can be made. A function of authentication server 255 is to communicate information, e.g., via network 240, to nexus-server 200, advising the nexus-server that identity has been authenticated for a user-registrant entity 250 seeking to register document(s) via system 235. It is understand that in the present invention, the scope of authentication includes at least that which has been described with respect to applicant's prior invention. In the present invention, the scope of authentication may be richer and can include an ability to capture enhanced identity authentication information (e.g., at least information C) sufficient to enable the system or a third party associated with the system to actually identify the user-registrant.

Figure 7:
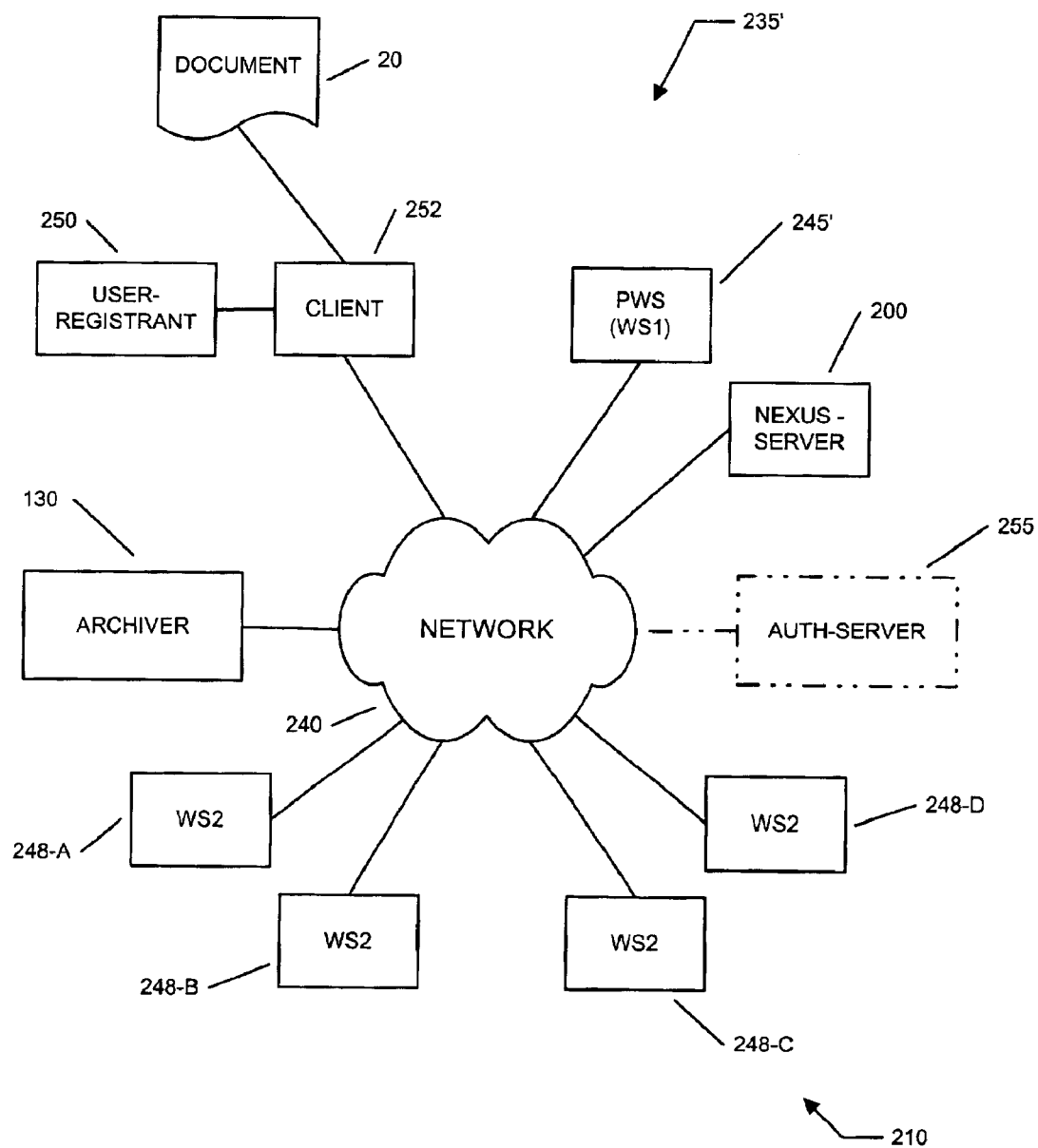
FIG. 7 is a block diagram showing an overall system with which the cluster of FIG. 6 may be used, according to the present invention.
Figure 8:
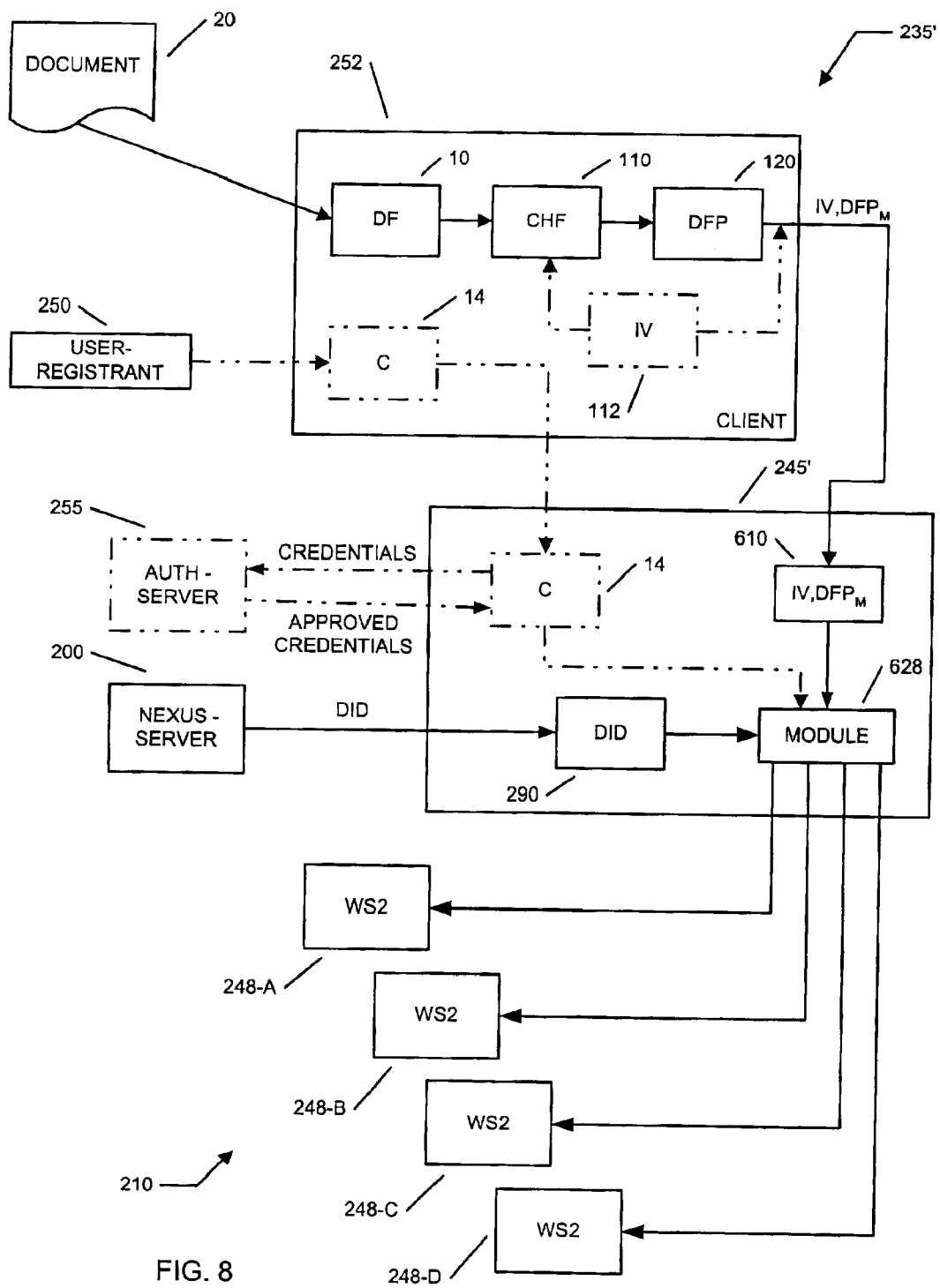
FIG. 8 depicts further detail associated with creation of a digital fingerprint, the registration protocol, and promulgation of information used with a system such as shown in FIG. 7, according to the present invention.

Referring now to FIG. 8, a user-registrant 250 causes a client system 252 to create a DFP 120 from a DF 10, optionally utilizing an initialization vector (IV) 112 to create the DFP. At least one one-way cryptographic hash function (CHF) 110 such as described earlier herein is preferably used to create the DFP. Each registration of a document 20 causes a nexus-generated document ID (DID) 290 to be associated with the document in question 20, to associate this instance of use (i.e., this act of registering a document) with a DID 290, to promulgate the DID/DFP throughout a network of witness servers, to ensure that a minimum quorum of servers receives this information, to construct a DFC based on the replies (acknowledgments or "ACKs") received from this quorum, and then to promulgate the DFC back to all witness-servers, including those witness servers participating in the quorum, and the client system. Optionally, in the preferred implementation, the client also causes a copy of the DF to be stored into an archive server (e.g., archive-server 130 shown in FIGS. 6 and 7, among other figures) along with the DFC. Advantageously, the archive server can verify the DF using the DFC, using the present invention.

FIG. 7 depicts the interrelationship between a human user-registrant 250 wishing to submit a document 20 (not necessarily authored by human 250) for registration with a system 235, according to the present invention. In the configuration of FIG. 7, user-registrant 250 submits document 20 for registration via a client 252 that communicates, e.g., via medium 240, with a primary witness server 245', with nexus-server 200, with a cluster 210 of witness-servers 248-x, archive-server 130, and with optional authentication server 255. It is to be understood, that "document" 10 and "communications medium" 240 are broadly defined herein.

FIG. 8 depicts further detail as to the functioning of client 252. Briefly, client 252 receives as input a document 20 and outputs at least a digital finger print. Client 252 also outputs optional initialization vector (IV) information, and optional credential (C) 14 information for user-registrant 250. Using procedures that may be identical to those earlier described with respect to FIGS. 2A–2C, a DF 10 is created and is processed through at least one one-way CHF 110 to yield a DFP 120.

As indicated by element 112, a quasi-random initialization vector (IV) may be used during the CHF and DFP processing to ensure that the output of a CHF for a given input will always produce differing results. As such, the relevant IV information will be promulgated with the DFP information to ensure later reconstruction of the DFP from underlying true document. Stated differently, use of an IV can help insulate the present invention against plain text cryptographic attacks or so-called dictionary attacks by an individual seeking to glean information relative to the underlying document. Thus as used herein, DFP may refer solely to a DFP as in applicant's first invention, or may refer to a collection of information including such a DFP as well as relevant IV information, as used in the present invention. Henceforth the notation $DFP_M$ shall denote that an initialization vector (IV) may also be present and associated with the DFP.

User-registrant 250 generally has available so-called credentials information that may include confidential information such as a secret, a PIN, a pass-phrase, generally known only to that entity. Presentation of such credential information to an appropriate authenticating entity (e.g., an authentication server 255 as shown in FIG. 6) can help establish user-registrant identification. Accordingly, client 252 preferably also provides a credentials function 14. Without limitation, such confidential information may include a password, actual or perhaps biometric, media information such as an ATM card, an identification card, etc.

DFP 120 is preferably generated by client system 252 and may be represented and/or encoded in a variety of ways including, without limitation, one or two-dimensional barcoding, use of human-readable text, etc. As such, the DFP may be represented or encoded in a manner compatible with paper-based documents. Thus, if desired, a DFP may be printed, stored on microfiche, among other conventional paper-based archiving techniques, and may later be converted back to an electronic representation of DFP 120.

As shown in FIG. 8, the $DFP_M$ output, optional IV output, and credentials (C) output from client 252 are communicated to the primary witness server (PWS or WS1) 245' selected by user-registrant 250. Preferably the PWS includes a function 610 to combine IV and $DFP_M$ information received from client 252 for presentation to module 628, which module also receives as input the credentials (C) information 14 output by client 252, optionally having first been successfully verified by authentication server 255. In addition, module 628 can receive the Document ID (DID) number 290 that nexus-server 200 issues, preferably at least quasi-randomly for the document 20 being registered. Module 628 logically links the DID, IV, and $DFP_M$ information and promulgates the thus-linked information to at least some and preferably all witness-servers 248-x in the relevant cluster 210.

Figure 9:
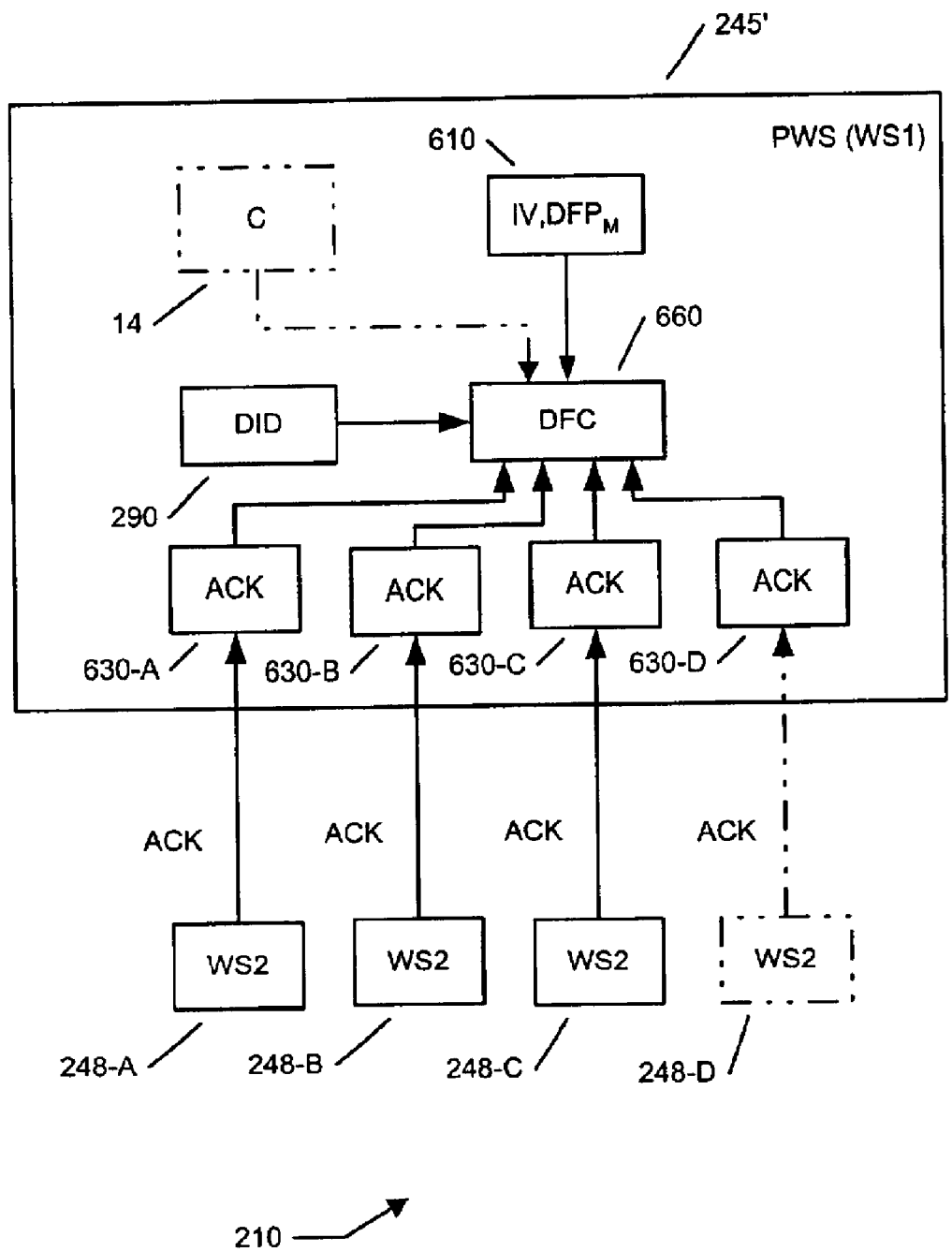
FIG. 9 depicts further detail of the registration protocol, including creation of a declaration of fidelity certificate by a primary witness server, according to the present invention.

In an ideal world, each witness-server 248-x in cluster 210 will correctly receive the DID, IV, and $DFP_M$ information promulgated by the PWS substantially in real-time, and will issue an acknowledgment (ACK) signal back to the PWS confirming such receipt. However as shown by FIG. 9, in practice some witness-servers, e.g., 248-D, will be unable to issue the ACK signal. Thus, the PWS will receive ACK response signals from less than 100% of the witness-servers comprising cluster 210. By way of example, in FIG. 9, PWS 245 is shown receiving ACK signals (e.g., 630-A, 630-B, 630-C) from some of the witness-servers (e.g., 248-A, 248-B, 248-C), but not from witness-server 248-D. It will be appreciated that the absence of an ACK signal from some witness-servers could result from WS non-receipt of the proper incoming DID, IV, $DFP_M$ information, or from a communications break preventing a properly issued ACK signal from being communicated to the PWS 245.

As further shown in FIG. 9, such ACK responses as are received from witness-servers in the relevant cluster 210 are combined within the PWS 245 with DID information 290, with IV, $DFP_M$ information 610 and with optional credentials information (C) 14 to create a "declaration of fidelity" certificate (DFC) 660. Preferably the DFC includes an amalgamation of at least all of this ACK, DID, IV, $DFP_M$, and, optional, C information. Such amalgamation may be collected and encoded in many ways well known to those skilled in the art, e.g., XML, ASCII representations, binary representations, MIME messages, ISO-Latin 1 XML, among other methods. It is understood that the minimum number of responding-acknowledging witness-servers will be at least a quorum number Q. The considerations giving rise to the magnitude of a quorum number Q may be identical to what has been described earlier herein with respect to applicant's parent or first invention. Thus, FIG. 9 exemplifies creation of a DFC 660.

Figure 10:
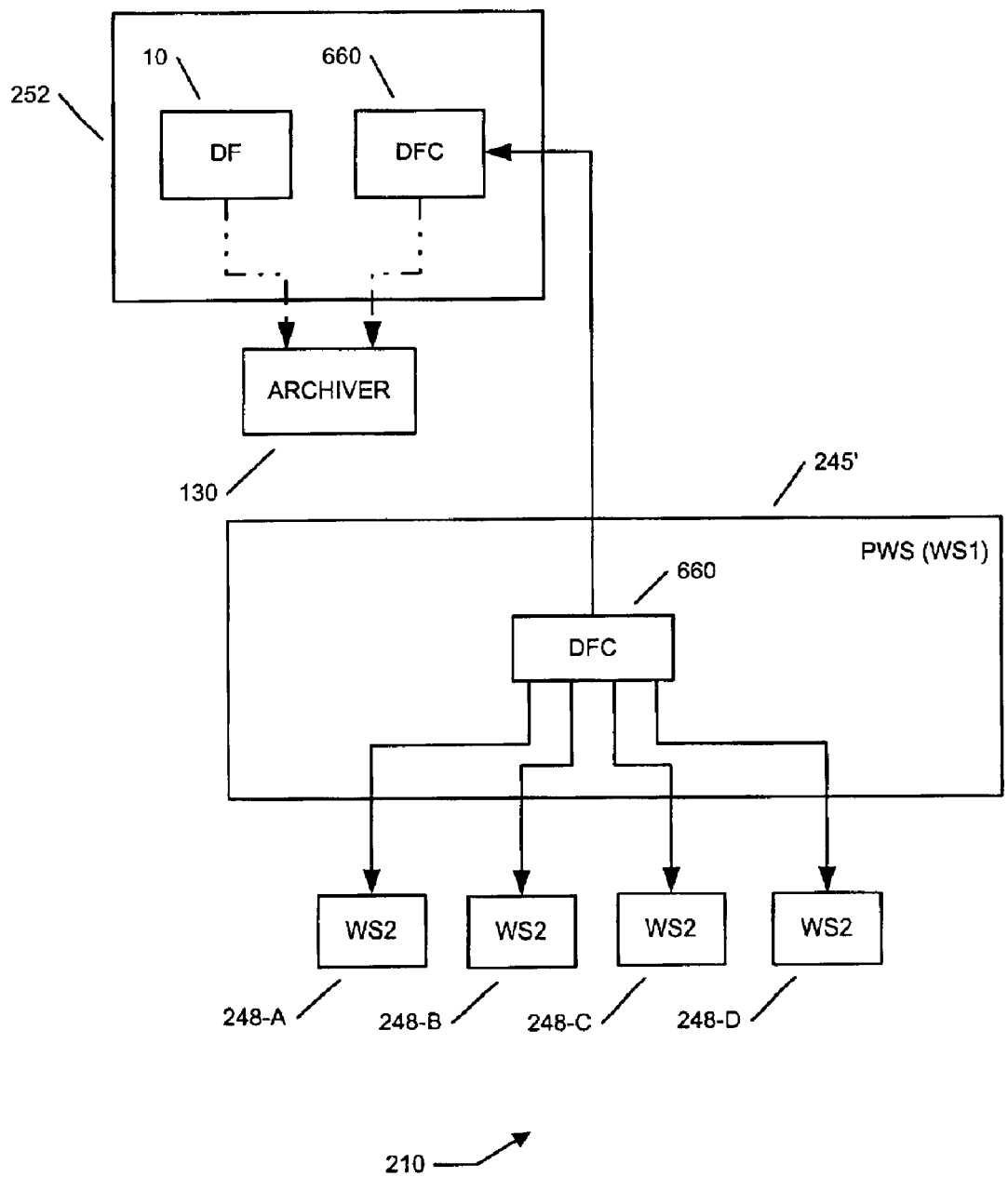
FIG. 10 depicts completion of the registration protocol, the synchronization protocol, and the promulgation of a declaration of fidelity certificate, according to the present invention.

FIG. 10 depicts promulgation of DFC 660 by the PWS 245 to the witness-servers in the relevant cluster(s), here cluster 210, as well as promulgation to client 252. Client 252 preferably combines DFC information 660 with DF 10 and provides the resultant information to archive-server 130 for storage. Archiver 130 preferably is located within a secured network (e.g., behind a firewall). Neither the nexus-server nor any witness server need know of the presence of archive-server 130. Preferably communication of the DFC by the PWS 245 to the witness-servers and to the client takes place through a network, where "network" is broadly defined herein.

Witness-servers receiving the promulgated DFC will store this information archivally. The time duration of the storage typically will have been determined contractually or otherwise between entities owning or controlling the relevant witness-servers (e.g. months, years, decades). In practice, the time duration of storage likely will have been considered by the user-registrant 250 who selected the relevant cluster (s), here cluster 210. Preferably archive-server 130 will store the relevant DF and DFC information for at least as long as the witness-servers will maintain associated DFC storage. It will be appreciated that within a cluster, witness-servers might store DFC information for one document for one time duration, yet store DFC information for another document for another time duration, where the relevant time duration for storage is acceptable to the user-registrant associated with each document.

Note that upon receiving DF and DFC information from client 252, archive-server 130 can verify authenticity of the DFC. Authenticating techniques can include treating the DF as representing a putative document, and then using the DFC to verify authenticity of the document. Alternatively, the archive-server can compare the DFC just-received with the DFC retained by one or more relevant witness-servers. Further, the archive-server might compare time-stamp information contained in the DFC to time-stamp information associated with DFCs stored in the relevant cluster to verify timeliness of registration. If desired, the client can examine the credential information that may be present in the DFC to determine whether it is appropriate to store the underlying document on the archive server 130. For example, identity of the user causing document promulgation might somehow fall beyond the class of expected users given identity of the user-registrant 250.

It will be recalled that in applicant's first invention, the witnessing process intentionally did not promulgate confidential information. By contrast, FIGS. 11–14 depict an enhanced embodiment of the present invention in which confidential information may be distributed. More specifically, this enhanced embodiment enables a user-registrant to affix an electronic signature to a document to be promulgated by the system. The electronic signature can be substituted for the user-registrant's actual signature for purposes that an actual handwritten signature might be used.

The user-registrant may regard the electronic signature as confidential, such that any indiscriminate promulgation thereof may be regarded as inappropriate. Accordingly, in the present embodiment, confidentiality of the electronic signature is protected by restricting its promulgation to known secure systems (so-called "systems of record" or SOR). However, the invention still allows the digital fingerprint information associated with both the document and the associated electronic signature to be promulgated within cluster(s) of witness-servers. Stated differently, only a known trustworthy system will receive, for retrieval, electronic signature information. Somewhat analogously to the use of pre-purchased coupons for certain user-registrants in the first invention, the present embodiment advantageously enables a user-registrant to affix his/her/its electronic signature as effortlessly as one might put a postage stamp on an envelope.

Figure 11:
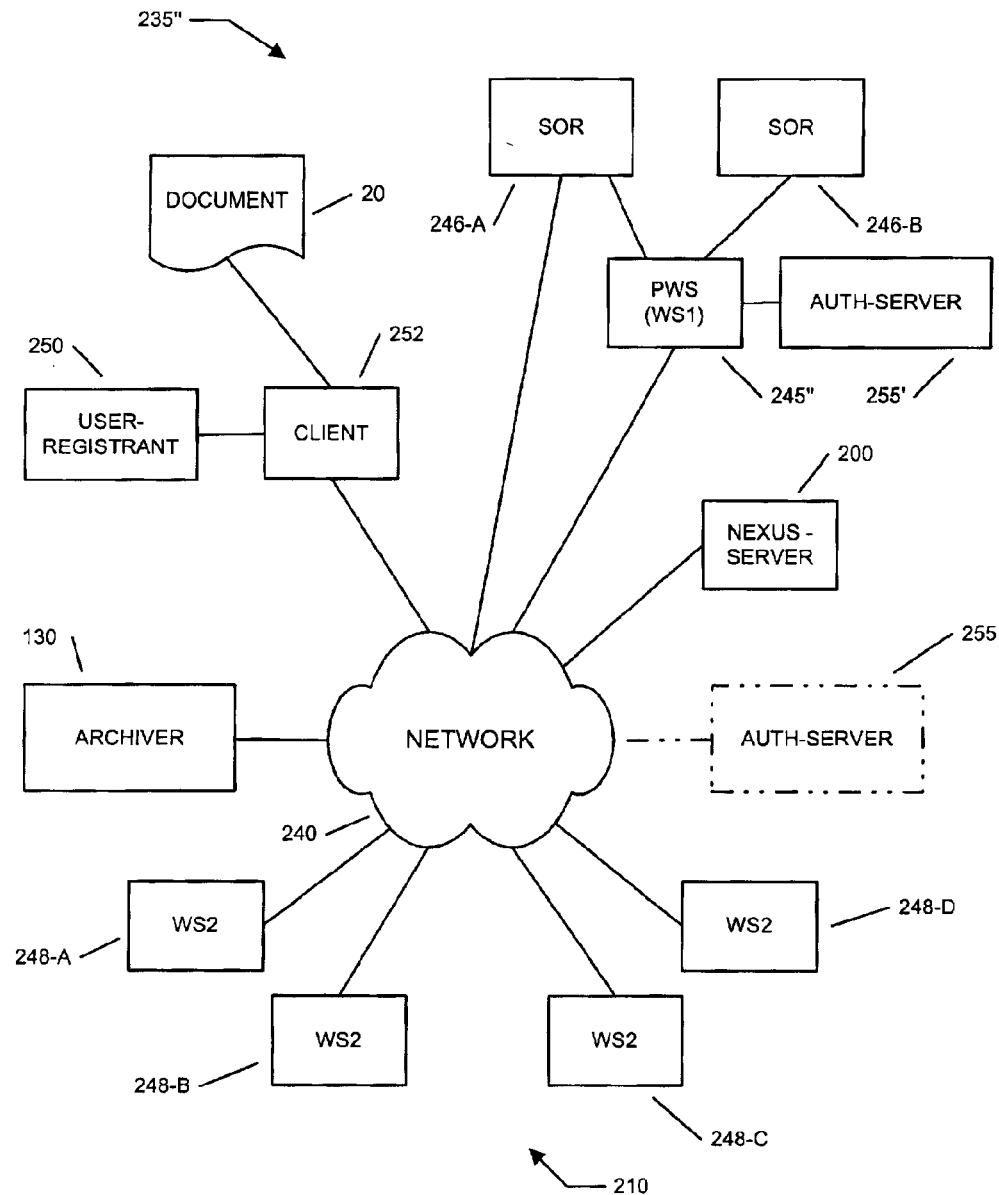
FIG. 11 depicts an overall block diagram of a second embodiment of a distributed information system, according to the present invention.

FIG. 11 is a block diagram of a system 235" according to the above-described enhanced embodiment. While portions of FIG. 11 are similar to other figures herein, e.g., FIGS. 6 and 7, note the inclusion of authentication-server 255', which is used to authenticate identity of the user-registrant and is typically affiliated with one or more specific PWS. Authentication-server 255' preferably is separately owned and/or controlled by the same entity owning and/or controlling the associated PWS, and thus authentication-server 255' is different from authentication-server 255 used in other embodiments herein. The services and functions of authentication-server 255' may be provided by a reputable third-party (e.g., Wells Fargo Bank) who can maintain ongoing records of all such authentication operations within SOR 246-x or a pre-existing system of record type system. Also note that a SOR type system may be connected to network 240, and be visible to other systems described herein (e.g. archive server 130, nexus-server 200, client system 252), as shown in FIG. 11 by SOR 246-A. In an equally preferable embodiment, a SOR type system such as SOR 246-B might not be connected to network 240, and might not be directly accessible from client 252.

Figure 12:
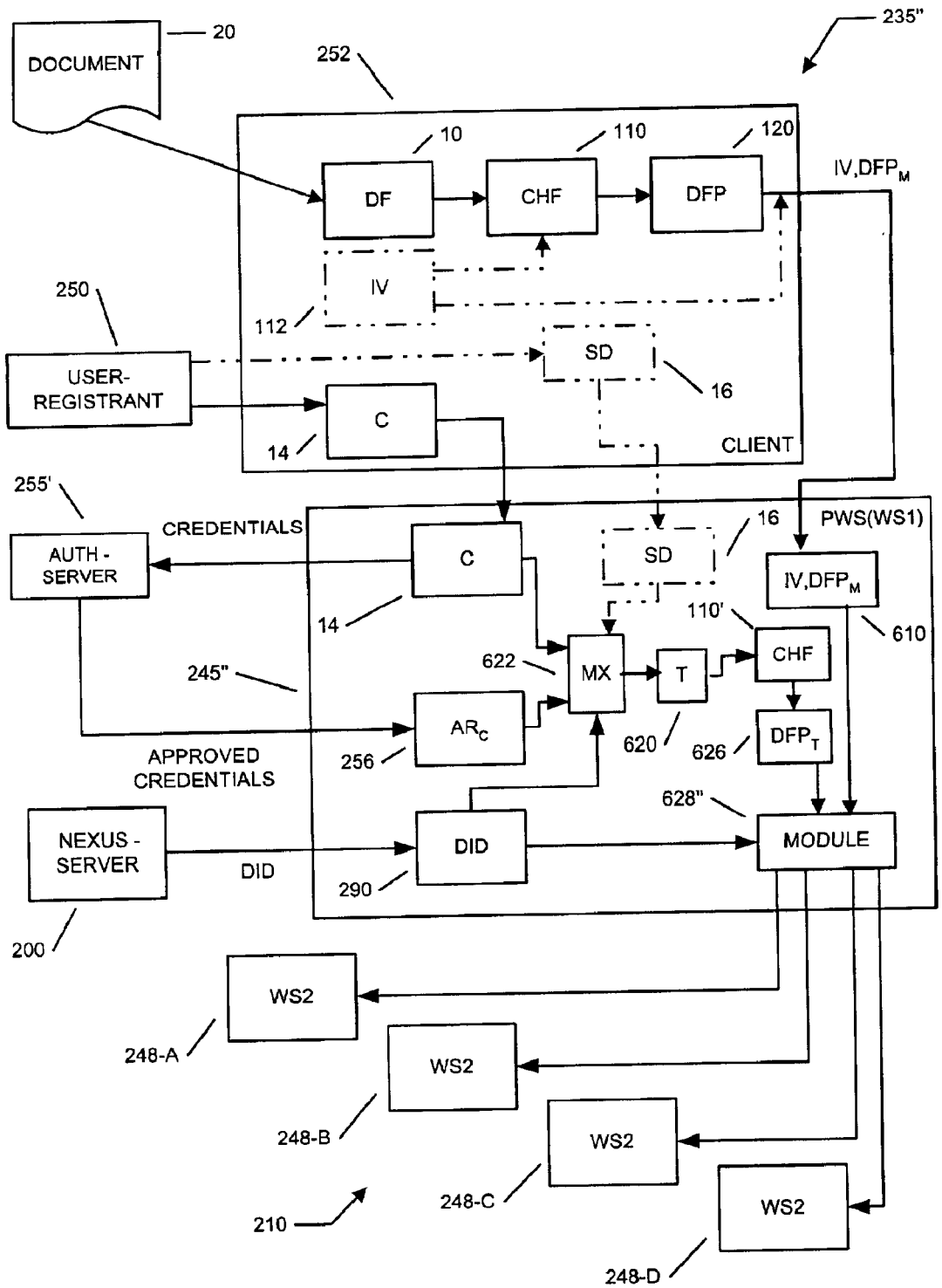
FIG. 12 depicts further detail associated with the creation of a digital fingerprint, the registration protocol and promulgation of information used with a system such as shown in FIG. 11 including creation of signature testimony, according to the present invention.

Referring now to FIG. 12, a yet more enhanced embodiment of a distributed system 235" is depicted, portions of which may be similar to system 235' shown in FIG. 8. In FIG. 12, a user-registrant 250 causes a client system 252 to generate a DFP 120 from a DF 10 that represents a document 20, as described earlier herein. A CHF 110 is used to generate the DFP, optionally using an initialization vector (IV) 112 in formulating the DFP, as described earlier herein. User-registrant 250 will also supply credential type information (C) 14, which along with an IV (if used) and $DFP_M$ information, is passed to the PWS 245'.

User-registrant 250 may also supply a Signature Declaration (SD) 16, that advantageously enhances effectiveness of the present invention. Use of SD 16 can remove ambiguity that might otherwise exist should a dispute arise as to why an electronic signature was affixed to a document promulgated through system 235". Further, SD 16 can resolve a dispute as to how the electronic signature should be correctly interpreted in the context of DF 120 and the associated document 20.

By way of example, a SD might store the phrase "I agree to the terms and conditions of agreement in the document I now submit", or "I agree to pay Jonathan $1,000,000", or perhaps "The affixed electronic signature indicates that the associated document has been certified as being authentic by the Court of Alameda County on the date contained within this Digital Fidelity Certificate".

Thus, a Signature Declaration (SD) according to the present invention enables inclusion of an explicit written expression of the intent of user-registrant 250 as to why its electronic signature was desired to be bound to DF 10 and the associated document 20, where the terms document and digital file are understood to be broadly defined.

The legal and cryptographic principles of "signing" a message digest such as a DFP are well understood and are widely accepted. Although the present invention can advantageously include and make use of a signature declaration, the invention can nonetheless function without a signature declaration and still implement legally binding electronic signatures. But as noted, the ability to provide an explicit declarative statement can be advantageous, especially if the user-registrant's intent is later called into question.

As noted, a registration certificate, e.g., a Declaration of Fidelity Certificate, preferably does not include information that reveals anything regarding content of the underlying document. It will be appreciated that inclusion of an SD according to the present invention advantageously permits capturing user-registrant intent, and subsequent affixing of an electronic signature to the document, without requiring disclosure of the document itself.

As with the earlier embodiment, e.g. 235, 235', the PWS obtains from nexus-server 200 a Document ID number (DID) 290. As previously described, the PWS may obtain DID values from a nexus-server when needed, or may advantageously pre-fetch these DID coupons in anticipation of actual need.

Credential type information (C) provides a mechanism to verify authenticity of the user-registrant 250's identity, and as such credential information 14 may include, without limitation, password information and/or credit card information. Credential information may also include two-factor type authentication such as biometric, devices such as SecurityDynamic's SecurID tokens, smart-cards. As noted, credential information may also include cryptographic secrets (e.g., symmetric and/or public-key cryptography) including the use of "one-time" secrets that may also include the use of cryptographic secrets.

Returning to FIG. 12, user-registrant 250 credential information 14 is received by PWS 245" from client 252, and is passed to authentication-server 255' for verification. Authentication-server 255' will determine whether the supplied credentials are authentic and currently valid (e.g., not expired). If appropriate, authentication-server 255' will return an "authentication record approval message" ($AR_C$) 256 to PWS 245". In effect, $AR_C$ 256 is a receipt that can be used by the PWS to reasonably establish identity of user-registrant 250, and to demonstrate the bona fides of the user-registrant-supplied credentials at some later date, upon request. The inclusion of $AR_C$ 256 in the user-registrant's electronic signature created by the PWS enables a third party who later retrieves and examines the electronic signature to be reasonably assured as to identity of that user-registrant. Note that SD 16, if provided, may also be included in the electronic signature.

In FIG. 12, module 610 receives from client 252, $DFP_M$ 120 and (optional) IV output 112 for the DF 10 associated with document 20. Preferably PWS 245' includes a module 622 that receives DID 290 (from nexus-server 200), credential information 14 (from client 252), signature declaration 16 (optional), both provided by user-registrant, and $AR_C$ 256 provided by authentication sever 255'. Module 622 logically links this information (e.g. DID, C, SD, $AR_C$) together to create testimonial information (T) 620. Testimony information (T) 620 is passed through a one-way cryptographic hash function (CHF) 110' which may be similar to CHF 110 (shown in FIG. 2, 8, 12) to produce $DFP_T$ 626. Module 628" promulgates the DID 290, (optional) IV 112 and $DFP_M$ 120, and $DFP_T$ 626 to at least one and preferably all witness-servers 248-x in relevant cluster 210.

The thus-promulgated DID, $DFP_T$ information is analogous to the DID, IV, $DFP_M$ information that is promulgated as was described with respect to system 235' in FIG. 7–10; and module 628" in FIG. 12 is similar to module 628 in FIG. 8, but different in that system 235" also promulgates the digital fingerprint of the testimony ($DFP_T$).

Figure 13:
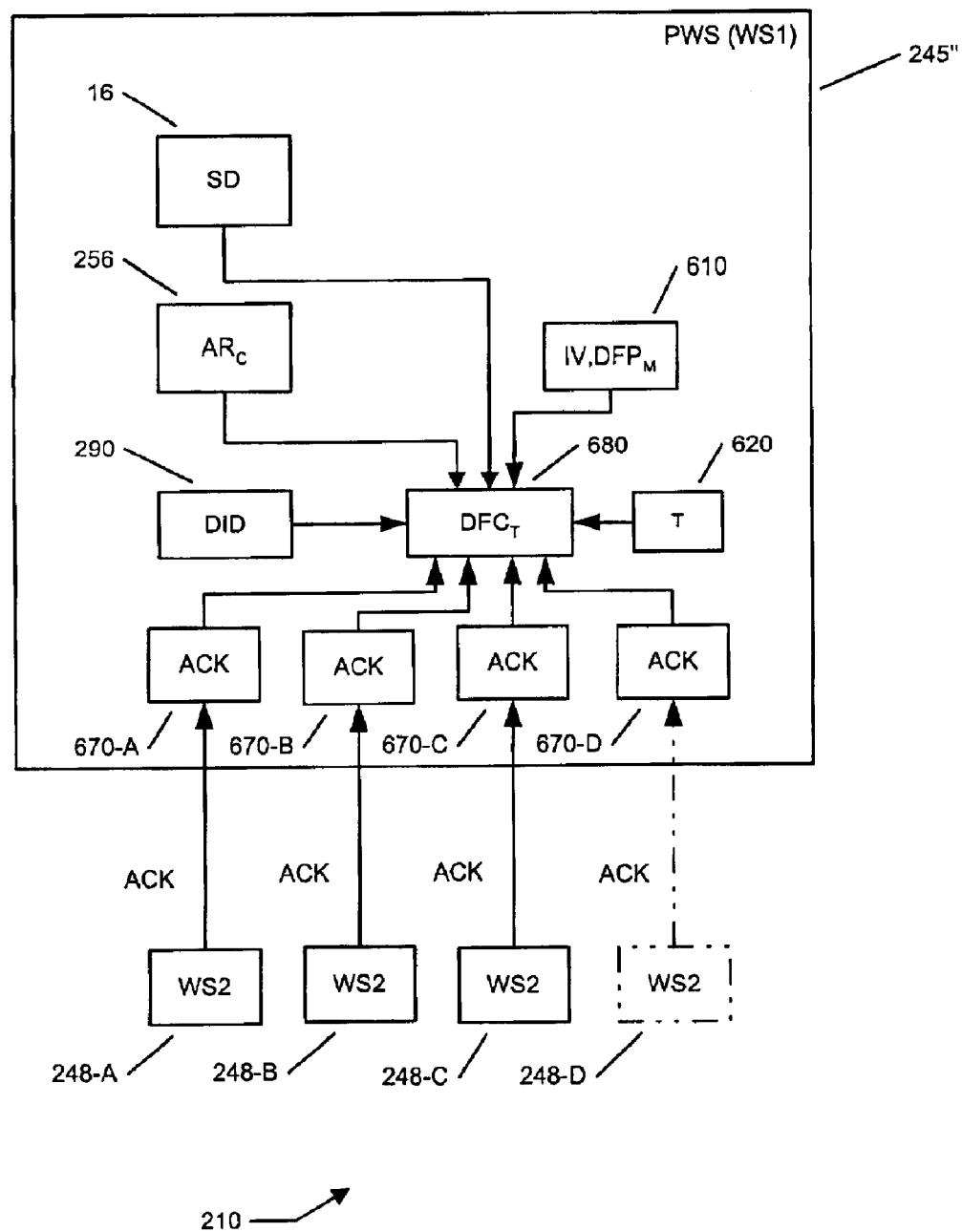
FIG. 13 depicts further detail in the registration protocol, including creation of a declaration of fidelity certificate used by a system such as shown in FIG. 11, including testimony to produce an electronic signature, according to the present invention.

Ideally, each witness-server 248-x in cluster 210 will correctly receive the DID, IV, $DFP_M$ and $DFP_T$ information promulgated by the PWS substantially in real-time, and will issue an acknowledgment (ACK) signal back to the PWS confirming such receipt. However as shown by FIG. 13, in practice some witness-servers, e.g., 248-D, may be unable to issue the ACK signal. Thus, the PWS may receive ACK response signals from less than 100% of the witness-servers comprising cluster 210. By way of example, in FIG. 13, PWS 245" is shown receiving ACK signals (e.g., 670-A, 670-B, 670-C) from some of the witness-servers (e.g., 248-A, 248-B, 248-C), but not from witness-server 248-D. It will be appreciated that the absence of an ACK signal from some witness-servers could result from WS non-receipt of the proper incoming DID, IV, $DFP_M$, $DFP_T$ information, or from a communications break preventing a properly issued ACK signal from being communicated to the PWS 245".

As noted, preferably under the system and protocol used, WS2 will maintain a copy of promulgated information at least until an appropriate certificate (e.g., DFC or $DFC_T$) issues, which is to say, until the protocol is complete. As all WS thus maintain promulgated information, the overall system can reconstruct and reissue a DFC if needed, e.g., perhaps in the event of a catastrophic transmission medium failure. As noted earlier, an attribute of the transmission medium is that the overall system is advised of non-receipt of information to be transmitted via the medium. Thus, the present invention advantageously can survive failures and continue to function as intended even in the presence of errors in the underlying sub-systems and media upon which the invention is implemented. Further, each embodiment of the present invention can resume operation using partially completed registration information.

As further shown in FIG. 13, such ACK responses as are received from witness-servers in the relevant cluster 210 are combined within the PWS 245" with information retained in modules 610 and 620 to create a signature fidelity certificate ($DFC_T$) 680. Preferably, $DFC_T$ includes an amalgamation of at least all of this ACK, DID, IV, $DFP_M$, T, and $DFP_T$ information. As previously described herein, said testimony information (T) 620 may consist of DID, C, SD, and $AR_C$. Such amalgamation may be collected and encoded in many ways well known to those skilled in the art, e.g., XML, ASCII representations, binary representations, MIME messages, ISO-Latin 1 XML, among other methods. Furthermore, the method by which this information is promulgated throughout the cluster of witness-servers may be accomplished by any number of ways using any number of tools well known to those skilled in the art, e.g. LDAP replication, database synchronization, shadowing, mirroring, "rsync", etc. It is further understood, as with all previously described embodiments, that the minimum number of responding acknowledging witness-servers will be at least a quorum number Q. The considerations giving rise to the magnitude of a quorum number Q may be identical to what has been described earlier herein with respect to applicant's parent or first invention.

Figure 14:
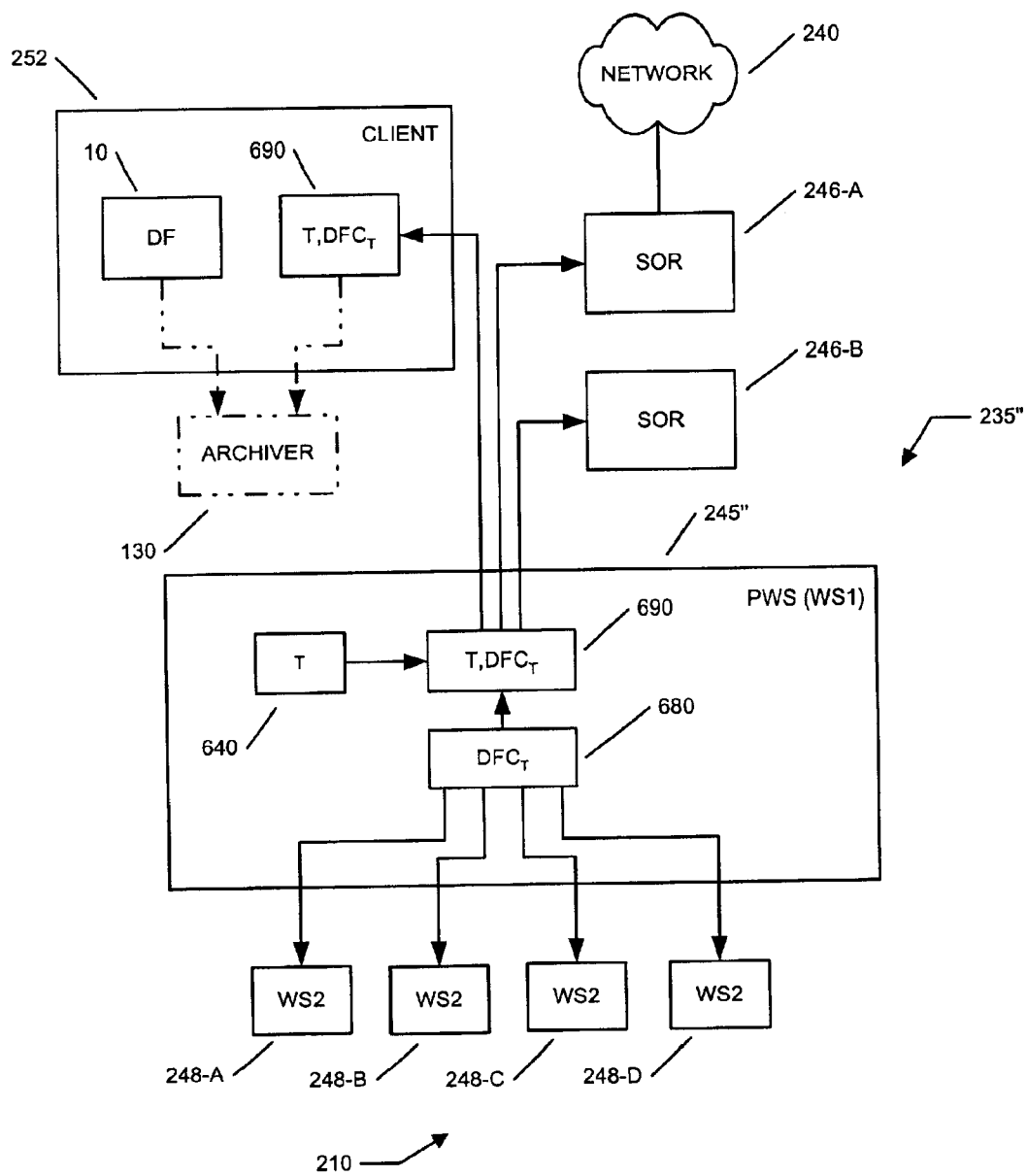
FIG. 14 depicts completion of the registration protocol, the synchronization protocol, and the promulgation of a declaration of fidelity certificate used with a system such as shown in FIG. 11, including promulgation of signature testimony to a system-of-record storage system according to the present invention.

Thus, FIG. 13 exemplifies creation of a signature fidelity certificate ($DFC_T$) 680. FIG. 14 depicts promulgation of certificate 680 by the PWS 245 to the witness-servers in the relevant cluster(s), here cluster 210. Preferably, testimony information 620 is combined with $DFC_T$ in module 690, and also promulgated to client 252. Client 252 preferably logically links the testimonial and $DFC_T$ information 690 with DF 10 and provides the resultant information to archive-server 130 for storage. Archiver 130 preferably is located within a secured network (e.g., behind a firewall). Neither the nexus-server nor any witness server need know of the presence of archive-server 130. Preferably communication of the $DFC_T$ by the PWS 245 to the witness-servers and to the client is via network 240. It is understood that "network" 240 is broadly defined. A property of the network or transmission medium is that the information in question will eventually be delivered to the intended recipient, or if delivery does not occur, advising the sender that receipt of the information has not occurred.

As previously noted, the testimonial information 690 contains information that may be deemed confidential, and thus only information which does not reveal anything regarding the user-registrant or the witnessed document is promulgated to the cluster of witness-servers within which the document was registered.

However, in the preferred embodiment, PWS 245 can preferably also communicate (e.g., through a network or otherwise) with at least one system of record (SOR) 246-A, 246-B, and promulgate a copy of the testimonial and digital signature information 690 for archiving. Preferably, the entity maintaining authority and control over the PWS and authentication-server also maintains the SOR.

Advantageously, such SOR can communicate with entities external to system 235", for example with entities requesting authentication of the digital signature associated with a putative document otherwise registered within a cluster of witness-servers. As used herein, an SOR is an archiving storage facility similar perhaps to archive-server 130. An SOR will typically store testimony information allowing a document, processed as described herein, to be accorded the legal effect, validity, and enforceability of a document bearing the electronic signature of the user-registrant 250 submitting the document for registration.

As with the other registration certificate type information described earlier (e.g. signature fidelity certificates and Declaration of Fidelity Certificates), witness-servers receiving the promulgated certificate (e.g. DFC and $DFC_T$) will also store this information archivally in a manner so earlier described.

To recapitulate, FIGS. 4 and 5 highlight applicant's first invention. FIG. 6 introduces portions of applicant's present invention, e.g., archiver 130. FIG. 7 depicts an enhanced witnessing system 235', according to the present invention, whereas FIGS. 8–10 depict further details of system 235'. FIG. 11 depicts an enhanced witnessing system 235" with electronic signature capability, according to another embodiment of the present invention. FIGS. 12–14 depict further details of system 235".

Turning now to FIG. 15A, additional implementations that may be practiced by applicant's first invention and/or the present invention are shown. More specifically, FIG. 15A depicts sharing of common resources, e.g., nexus 2100, archiver 2070, optionally protected by firewall 242, among several witness server clusters 235A,235B. Note that the functionality of archive-server 130 may be provided by a third-party document management company. Alternatively, the archive-server functions may be provided by a local area network within which the user-registrant resides.

As a further example of the flexibility with which applicant's first invention and/or the present invention may be implemented, FIG. 15B depicts a configuration in which witness server clusters 235C and 235D share some WS, e.g., WS 3110A, 3110B, as well as a common archiver 3070. Note too that if desired, at least some WS may be protected behind a firewall 242 to help guard against unauthorized access and/or misuse.

Figure 16:
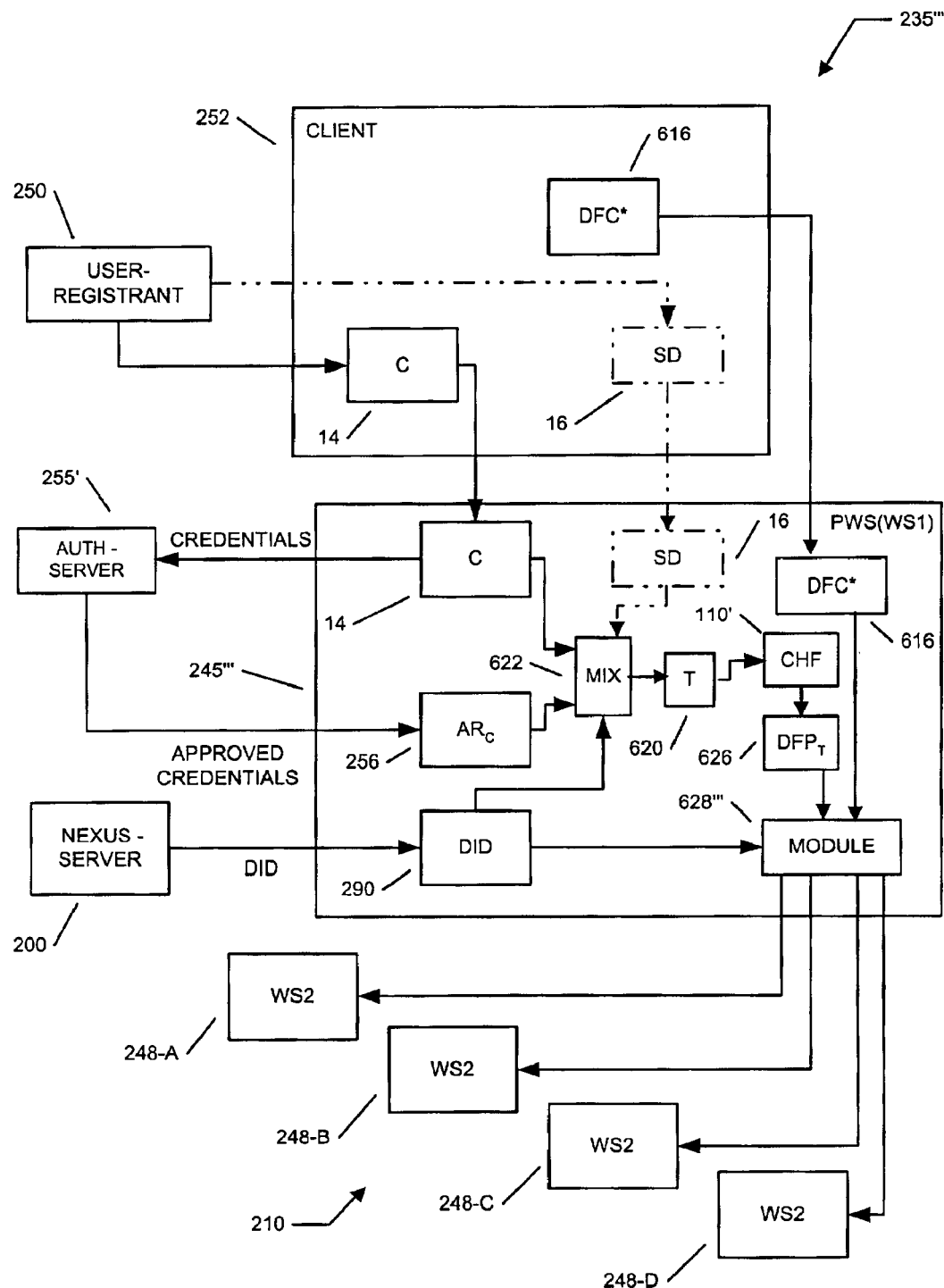
FIG. 16 depicts the addition of a electronic signature to a preexisting registration certificate, according to the present invention.

FIG. 16 shows a distributed information system 235''' that bears some similarity to the embodiment depicted in FIGS. 11–14. However, system 235''' advantageously further permits user-registrant 250 to specify the registration certificate of a document previously promulgated by a system according to the present invention and/or parent invention. More specifically, this enhanced embodiment, shown in FIGS. 16–18, enables a user-registrant to affix an electronic signature to a document previously promulgated, for example by applicant's parent invention or by the present invention. In this enhanced embodiment, an electronic signature can be substituted for the user-registrant's actual signature for purposes that an actual handwritten signature might be used.

As noted earlier, the electronic record containing this registration certificate (e.g., certificate 400 in FIG. 5, DFC 660 in FIGS. 8–10, $DFC_T$ 680 in FIGS. 12–14, and/or FIGS. 16–18) may itself be treated as a digital file. As such, the registration certificate can be witnessed and/or signed in a manner consistent with any embodiment of applicant's parent or present invention. Advantageously, system 235''' permits a previously created registration certificate 616 (denoted now as DFP*) associated with a given document to be directly substituted in place of any new IV/DFP information to be created from the same document. Such direct substitution eliminates the need to generate new IV/DFP information for the document to be signed, and advantageously also allows multiple parties to apply their own electronic signature to the very same copy of the registration certificate, i.e., DFP'.

In other words, system 235''' permits multiple user-registrants to affix their respective electronic signatures to the same electronic record (i.e. DFP*), thus allowing simultaneous creation of electronic signatures by multiple parties that can be simultaneously affixed to identical copies of the same document. Furthermore, a user-registrant desiring to add an electronic signature to a document need only obtain a copy of the relevant DFC*, thus advantageously alleviating the need to obtain a copy of the entire document. This allows for the creation and affixing of electronic signatures using clients with limited memory storage, communication bandwidth, and/or computational capacity. Stated differently, in earlier embodiments, it would have been necessary for the client to process the entire document rather than a smaller size electronic record (i.e., a registration certificate). Thus, using the present invention, a client with the limited capacity of a web-enabled cellular telephone, a PDA, an automated teller machine (ATM), a Kiosk, etc. might still be able to retrieve a registration certificate and augment an electronic signature thereto.

More specifically, a user-registrant causes a client system 252 to include a registration certificate (DFC*) 616, corresponding to previously registered DF 10, as described earlier herein. User-registrant 250 will also supply credential type information (C) 14. As noted, the user-registrant may also supply a signature declaration (SD) 16 as part of its/their electronic signature, thus enabling inclusion of an explicit written expression of the intent of user-registrant 250 as to why its electronic signature was desired to be bound to the associated document with registration certificate (DFC*) 616.

As with systems 235, 235', 235'' described herein, in system 235''', the PWS obtains from nexus-server a Document ID number (DID) 290, and passes the credential information (C) 14 received from user-registrant 250 to authentication-server 255' for verification. Further, PWS 245''' will obtain a copy of an authentication record approval message, as noted.

Referring still to FIG. 16, module 628''' receives DFP* 616 for the DF 10 associated with document 20 from client 252. Module 628''' logically links this information with DID 290 (received from nexus-server 200), credential information 14 (received from client 252), signature declaration 16 (optional), and $AR_C$ 256 (provided by authentication sever 255'). Testimonial information (T) 620 is created by the PWS from the thus-linked information. Testimony information (T) 620 is passed through a one-way cryptographic hash function (CHF) 110' that may be similar to CHF 110 (shown in FIGS. 2, 8, 12) to produce $DFP_T$ 626. Module 628''' then promulgates this information to at least one and preferably all witness-servers 248-x in relevant cluster 210.

Comparing FIG. 16 and FIG. 12, note that the thus-promulgated DID, $DFP_T$ information typically will be the same as the DID, $DFP_T$ information promulgated by system 235''. More specifically, note that module 628''' in FIG. 16 is similar to module 628'' in FIG. 12, and typically differs in that system 235''' promulgates a digital fingerprint from the registration certificate DFC*.

Figure 17:
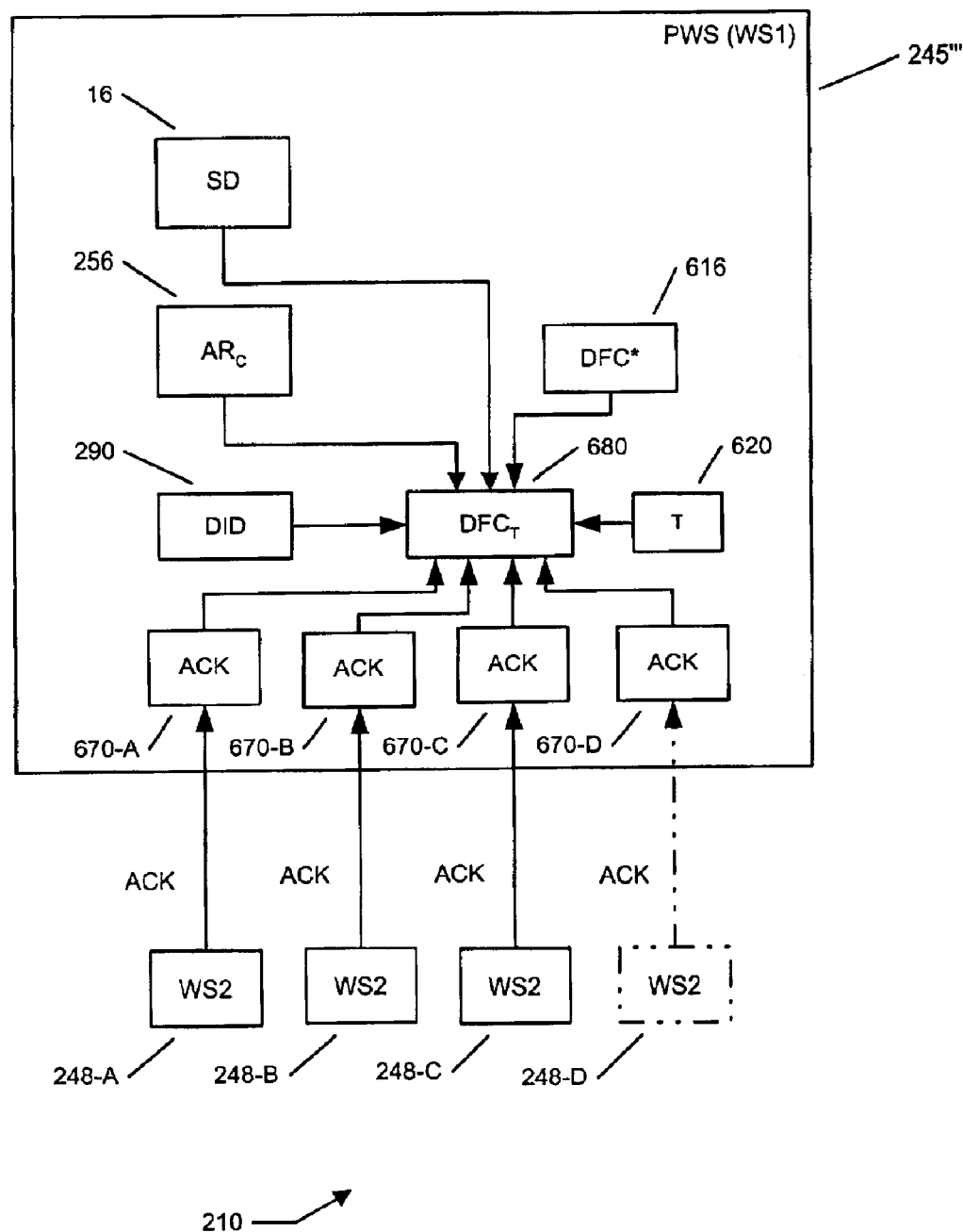
FIG. 17 depicts further detail in the registration protocol in which a preexisting registration certificate is used in lieu of a document by the system of FIG. 16, including testimony to produce an electronic signature, according to the present invention.

Turning now to FIG. 17, ideally, each witness-server 248-x in relevant cluster 210 will correctly receive substantially in real-time the DID, DFP* and $DFP_T$ information promulgated by the PWS, and will issue an acknowledgment (ACK) signal back to the PWS confirming such receipt. However as shown by FIG. 17, in practice some witness-servers, e.g., 248-D, may be unable to issue the ACK signal, and the PWS may receive ACK response signals from less than 100% of the witness-servers comprising cluster 210. By way of example (and in a manner analogous to FIG. 13), PWS 245''' in FIG. 17 is shown receiving ACK signals (e.g., 670-A, 670-B, 670-C) from some of the witness-servers (e.g., 248-A, 248-B, 248-C), but not from witness-server 248-D. Thus, FIG. 17 exemplifies creation of a signature fidelity certificate ($DFC_T$) 680 based upon a registration certificate (DFP*) 616.

FIG. 17 further depicts creation of certificate 680 by the PWS 245'''. Similarly to system 235'' shown in FIGS. 12–14, in system 235''' in FIG. 17, testimony information 620 preferably is combined with $DFC_T$ in module 690, and is promulgated to client 252. Client 252, in turn, preferably logically links the testimonial and $DFC_T$ information 690 with DF 10, and provides the thus-linked resultant information to archive-server 130 for storage, as has been described. However, in FIG. 17, PWS 245''' can preferably also promulgate a copy of the testimonial and digital signature information 690 for archiving with at least one system of record (SOR) 246-A, 246-B, as has been described herein.

To recapitulate, registration certificate (DFP*) 616 can be another signature fidelity certificate. Thus, the enhanced embodiment shown in FIGS. 16 and 17 (as well as 18) enables a user-registrant to affix an electronic signature to a document that was previously promulgated by applicant's first invention or by the present invention. Further, such electronic signature can be substituted for the user-registrant's actual signature for purposes for which an actual handwritten signature might be used. As with the other registration certificate type information described earlier (e.g. signature fidelity certificates and Declaration of Fidelity Certificates), witness-servers receiving the promulgated certificate (e.g. DFC and $DFC_T$) will also store this information archivally, also in a manner so earlier described.

Figure 18:
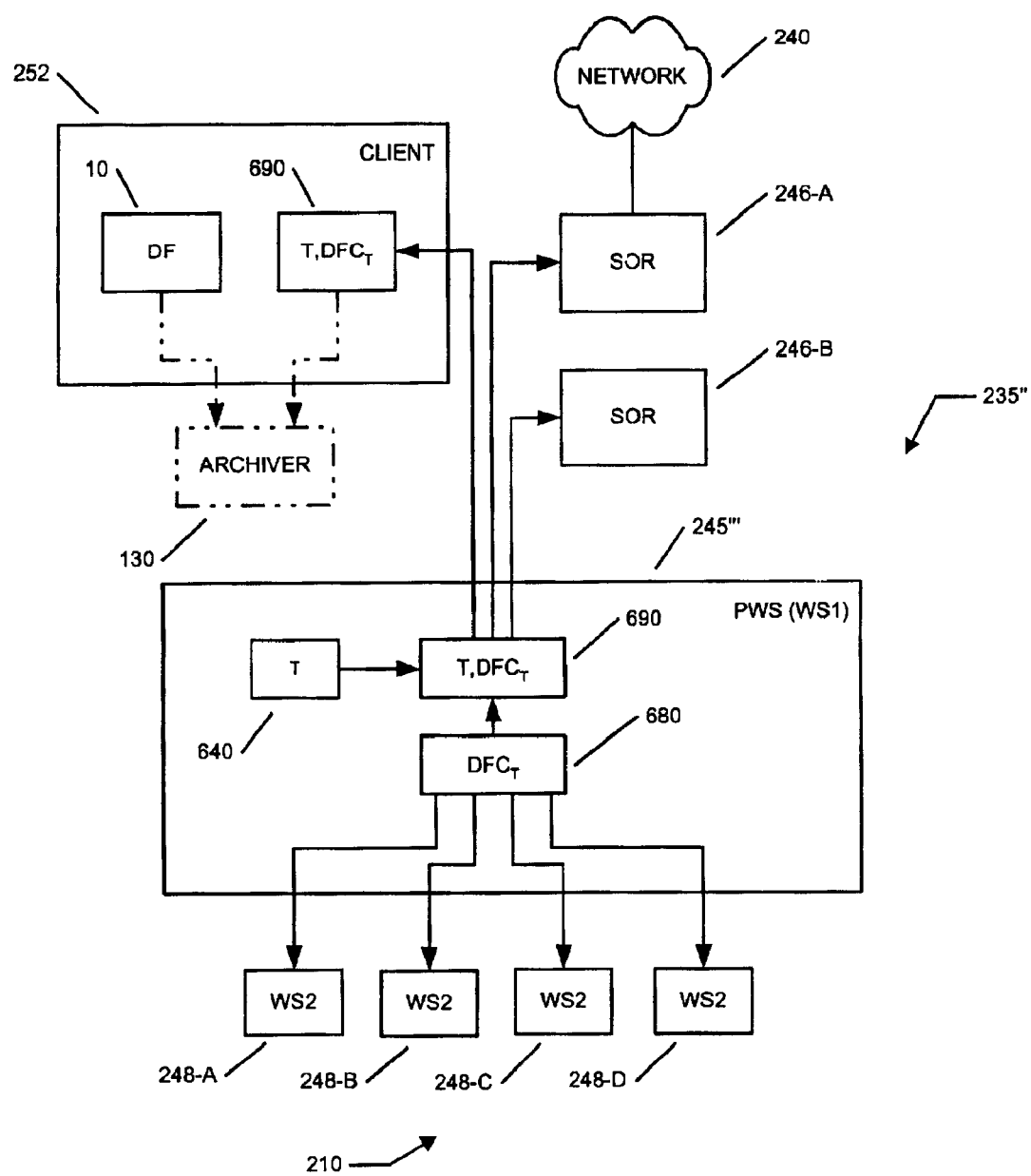
FIG. 18 depicts completion of the registration protocol, the synchronization protocol, and the promulgation of a signature fidelity certificate used with a system such as shown in FIG. 16, including promulgation of signature testimony to a system-of-record storage system according to the present invention.

FIG. 18 depicts completion of the registration protocol, the synchronization protocol, and the promulgation of a signature fidelity certificate used with a system such as shown in FIG. 16. FIG. 18 also shows promulgation of signature testimony to a system-of-record storage system, according to the present invention, for example such as described with respect to system 235'' in FIG. 14.

Modifications and variations may be made to the disclosed embodiments without departing from the subject and spirit of the invention as defined by the following claims.

What is claimed is:

1. A method to verify authenticity of a document having an electronic signature associated therewith, said document being digitally representable as a file (DF) that is processed with a cryptographic hash function (CHF) to yield a unique digital fingerprint number (DFP) associated with said DF, the method comprising the following steps:

(a) creating a document identification number (DID) uniquely associated with said DFP, and associating said DID with said DFP;

(b) obtaining and authenticating veracity of credential information (C), and associating said C with said DID and said DFP; and (c) storing, in at least two locations, registration certificate (DFC) that represents said electronic signature and includes said DID, said DFP, and said C, such that a single entity cannot modify every stored copy of said DFC;

wherein step (c) includes initially promulgating said DFC to at least a minimum number Q of N, where N>Q, storage locations (WS), and subsequently promulgating said DFP to any remaining (N-Q) said storage locations not initially receiving promulgated said DFC;

wherein authenticating whether a putative document digitally representable as a putative file DF' and by a putative registration certificate (DFC') associated therewith is an unaltered version of said document represented by said DF and is associated with said electronic signature includes;

comparing a putative digital fingerprint DFP' for said DF' obtained using said CHF with at least two retrieved copies of said DFP associated with the DFC stored at step (c);

wherein if said DFP' and said DFP are in agreement, said putative document is said document, and said electronic signature has not been altered.

2. The method of claim 1, wherein at step (b), said credential information (C) is obtained from a user-registrant who initiates said association of said DID with said DFP.

3. The method of claim 1, wherein at step (a), said credential information (C) includes at least one type of information selected from a group consisting of (i) user-registrant identity, (ii) user-registrant password, (iii) user-registrant provided authenticating information from a two-factor authentication device, (iv) user-registrant cryptographic key information, (v) user-registrant client system identifier, and (vi) user-registrant provided authenticating hardware token information.

4. The method of claim 1, wherein at step (a), said association of said DID with said DFP is initiated by a user-registrant, said user-registrant selecting an archive-server in which said DF and at least DFC information will be stored.

5. The method of claim 1, further including storing said DF and at least DFC information in an archive-server, said archive-server verifying authenticity of said DF and said at least DFC information stored therein.

6. The method of claim 1, wherein step (a) includes selecting a document identification number (DID) at least quasi-randomly.

7. The method of claim 1, wherein step (a) includes generating said document identification number (DID) by a nexus-server.

8. The method of claim 1, wherein said DFP is representable in at least one format selected from a group consisting of (i) a printable bar-code, (ii) a printable multi-dimensional bar-code, (iii) printed scannable information, (iv) scannable information, and (v) human-readable information.

9. The method of claim 1, wherein step (c) includes selecting locations for said storage at least quasi-randomly.

10. The method of claim 1, wherein said document is protectable by copyright law, and said method is carried out at least in part to protect a copyright for said document, wherein said copyright law is selected from a group consisting of (i) U.S. copyright law, and (ii) copyright law of nations other than the U.S.

11. The method of claim 1, wherein step (c) includes initially promulgating said DFC substantially in real-time.

12. The method of claim 1, wherein:

each of said Q storage locations independently determines and independently reports a timestamp including time of its receipt of said DFP; and said DFC stored at step (c) includes at least each independently reported said timestamp.

13. The method of claim 12, further including:

comparing time reported from each said timestamp to determine from a commonality thereof that time at which storing at step (c) occurred is not disputable.

14. A method to verify authenticity of a document having an electronic signature associated therewith, said document being digitally representable as a file (DF) that is processed with a cryptographic hash function (CHF) to yield a unique digital fingerprint number (DFP) associated with said DF, the method comprising the following steps:

(a) creating a document identification number (DID) uniquely associated with said DFP, and associating said DID with said DFP;

(b) obtaining and authenticating veracity of credential information (C), and associating said C with said DID and said DFP;

(c) creating a signature declaration (SD) that captures expressed intent of a user-registrant to create and associate said electronic signature with said document represented by said DF;

(d) creating a testimonial record (T) that includes at least said DID, said DFP, said C, and said SD, and creating from and associating with said T a unique digital fingerprint number ($DFP_T$), said $DFP_T$ obtainable from a cryptographic hash function ($CHF_T$); and (e) storing, in at least two locations, registration certificate ($DFC_T$) that represents said electronic signature and includes said DID, said DFP, said $DFP_T$, and said C, such that a single entity cannot modify every stored copy of said $DFC_T$;

wherein wherein step (e) includes initially promulgating said DFC to at least a minimum number Q of N, where N>Q, storage locations (WS), and subsequently promulgating said DFP to any remaining (N-Q) said storage locations not initially receiving promulgated said DFC;

wherein authenticating whether a putative document, digitally representable as a putative file DE' and associated with a putative registration certificate ($DFC_T'$) and associated with a putative testimonial record (T'), is an unaltered version of said document represented by said DF and is associated with said electronic signature includes:

comparing a putative digital fingerprint DFP' for said DF' obtained using said CHF with at least two retrieved copies of said DFP associated with the $DFC_T$ stored at step (e), and comparing a putative digital fingerprint $DFP_T'$ for said T' obtained using said $CHF_T$ with at least two copies of said $DFP_T$ associated with the $DFC_T$ stored at step (e);

wherein if said DFP' and said DFP are in agreement, said putative document is said document, and if said $DFP_T'$ and said $DFP_T$ are in agreement, said electronic signature has not been altered.

15. The method of claim 14, wherein said DF includes a $DFC_T$ previously stored at step (e).

16. The method of claim 14, further returning to said user-registrant information that includes at least said T and said $DFP_T$.

17. The method of claim 14, further including storing within a system-of-record information that includes at least said T.

18. The method of claim 14, wherein step (b) is carried out by a system-of-record that stores information including at least said T.

19. The method of claim 14, wherein at step (b), said credential information (C) is obtained from a user-registrant who initiates said association of said DID with said DFP.

20. The method of claim 14, wherein at step (b), said credential information (C) includes at least one type of information selected from a group consisting of (i) user-registrant identity, (ii) user-registrant password, (iii) user-registrant two-factor authentication, and (iv) user-registrant key information.

21. The method of claim 14, wherein at step (a), said association of said DID with said DFP is initiated by a user-registrant, said user-registrant selecting an archive-server in which said DF and at least DFC information will be stored.

22. The method of claim 14, further including storing said DF and at least DFC information in an archive-server, said archive-server verifying authenticity of said DF and said at least DFC information stored therein.

23. The method of claim 14, wherein step (a) includes selecting a document identification number (DID) at least quasi-randomly.

24. The method of claim 14, wherein step (a) includes generating said document identification number (DID) by a nexus-server.

25. The method of claim 14, wherein step (e) includes selecting locations for said storage at least quasi-randomly.

26. The method of claim 14, wherein step (e) includes initially promulgating said DFC substantially in real-time.

27. The method of claim 14, wherein:
each of said Q storage locations independently determines and independently reports a timestamp including time of its receipt of said DFP; and
said DFC stored at step (e) includes at least each independently reported said timestamp.

28. The method of claim 27, further including:
comparing time reported from each said timestamp to determine from a commonality thereof that time at which storing at step (c) occurred is not disputable.

29. A method to verify authenticity of a document optionally having an electronic signature associated therewith, said document being digitally representable as a file (DF) processable with a cryptographic hash function (CHF) to yield a unique digital fingerprint number (DFP) associated with said DF, where (i) a document identification number (DID) uniquely associated with said DFP has been created and associated with said DFP; where (ii) credential information (C) has bean obtained, its veracity confirmed, and said C associated with said DID and said DFP; and (iii) where there has been stored in at least two locations registration certificate (DFC) representing said electronic signature and including said DID, said DFP, and said C, such that a single entity cannot modify every stored copy of said DFC wherein said DFC has been promulgated to at least a minimum number Q of N, where N>Q, storage locations (WS), and has subsequently been promulgated to any remaining (N-Q) said storage locations not initially receiving promulgated said DFC; the method comprising the following steps:
(a) for a putative document, obtaining a digital representation thereof as a putative file DF' and obtaining a putative registration certificate (DFC') associated therewith;
(b) obtaining and comparing a putative digital fingerprint DFP' for said DF' obtained using said CHF with at least two retrieved copies of said DFP associated with said DFC;
wherein said putative document is an unaltered version of said document represented by said DF and is associated with said electronic signature; and includes:
if said DFP' and said DFP are in agreement, said putative document is said document, and said electronic signature has not been altered.

30. A system to verify authenticity of a document representable digitally, the system comprising:
a nexus-server having a CPU end memory and including means for quasi-randomly generating ID numbers, issuing customer ID numbers, issuing document ID numbers (DID), and issuing coupons bearing at least one of (i) CID, and (ii) DID;
at least two clusters of witness-server computer systems (WS), each having a CPU and memory, each of said witness-servers being operatively coupleable to each other and to said nexus-server for intercommunication therebetween;
wherein said nexus-server supervises adherence of said WS in a cluster to rules and protocols applicable to said cluster;
wherein one WS of said cluster, upon presentation by a user of said coupon and a digital fingerprint number (DFP) for said document obtained from a one-way cryptographic hash function (CHF), promulgates said coupon information and said DFP to a number of other witness-server computer systems in said cluster, wherein said number of other witness-server computer systems is at least two and is commensurate with the value of the coupon, and upon confirming receipt of said coupon information and said DFP, said witness-server computer system converting said coupon into a registration certificate containing at least said coupon information and said DFP, said registration certificate is returned to said user;
said system upon user-presentation of said registration certificate retrieving from at least some of said witness-server computer systems in said cluster a digital fingerprint number;
wherein comparison of the retrieved said digital fingerprint numbers against a digital fingerprint number newly generated for said document permits confirming said document has was not altered after presentation to said system.

31. A computer-readable medium storing computer-readable software that when executed by a computer system that includes a CPU carries out at least three of the following steps to verify authenticity of a document having an electronic signature associated therewith, the document being digitally representable as a file (DF) that is processed with a cryptographic hash function (CHF) to yield a unique digital fingerprint number (DFP) associated with said DF;
(a) obtaining and authenticating veracity of credential information (C), and associating said C with said DID and said DFP;

(b) creating a signature declaration (SD) capturing expressed intent of a user-registrant to create and associate said electronic signature with said document;

(c) promulgating for storage, in at least two locations, registration certificate (DFC) that represents said electronic signature and includes said DID, said DFP, said C, and at east one of (i) said SD, and (ii) a digital fingerprint of said SD, such that a single entity cannot modify every stored copy of said DFC;

wherein step (c) includes initially promulgating said DFC to at least a minimum number Q of N, where N>Q, storage locations (WS), and subsequently promulgating said DFP to any remaining (N-Q) said storage locations not initially receiving promulgated said DFC;

wherein authenticating whether a putative document digitally representable as a putative file DF' and by a putative registration certificate (DFC') associated therewith is an unaltered version of said document represented by said DF and is associated with said electronic signature includes:

(d) comparing a putative digital fingerprint DFP' for said DF' obtained using said CHF with at least two retrieved copies of said DFP associated with the DFC stored at step (c);

wherein if said DFP' and said DFP are in agreement, said putative document is said document, and said electronic signature has not been altered.

* * * * *